US012116975B1

(12) United States Patent
Rehman et al.

(10) Patent No.: US 12,116,975 B1
(45) Date of Patent: Oct. 15, 2024

(54) TURBINE BLADE WITH CURVED SUCTION SURFACE

(71) Applicant: KING FAHD UNIVERSITY OF PETROLEUM AND MINERALS, Dhahran (SA)

(72) Inventors: Shafiqur Rehman, Dhahran (SA); Luai M. Alhems, Dhahran (SA); Md. Mahbub Alam, Dhahran (SA); Longjun Wang, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/746,106

(22) Filed: Jun. 18, 2024

Related U.S. Application Data

(63) Continuation of application No. 18/152,860, filed on Jan. 11, 2023.

(51) Int. Cl.
*F03D 1/06* (2006.01)
*F03D 17/00* (2016.01)

(52) U.S. Cl.
CPC ........... *F03D 1/0675* (2013.01); *F03D 17/00* (2016.05); *F05B 2240/303* (2020.08); *F05B 2240/304* (2020.08); *F05B 2240/306* (2020.08); *F05B 2250/18* (2013.01); *F05B 2260/70* (2013.01); *F05B 2260/83* (2013.01)

(58) Field of Classification Search
CPC .. F03D 1/0675; F03D 17/00; F05B 2240/303; F05B 2240/304; F05B 2240/306; F05B 2250/18; F05B 2260/70; F05B 2260/83
See application file for complete search history.

(56) References Cited

U.S. PATENT DOCUMENTS

| 8,251,319 | B2 | 8/2012 | Jonker et al. |
| 2011/0229320 | A1 | 9/2011 | Hancock et al. |
| 2017/0284366 | A1 | 10/2017 | Spitzner |
| 2020/0072186 | A1* | 3/2020 | Kruse ................... F03D 1/0641 |

FOREIGN PATENT DOCUMENTS

| CN | 107264777 A | 10/2017 |
| EP | 2 527 642 B1 | 7/2015 |
| EP | 2 998 572 B1 | 9/2016 |

* cited by examiner

*Primary Examiner* — Aaron R Eastman
(74) *Attorney, Agent, or Firm* — Oblon, McClelland, Maier & Neustadt, L.L.P.

(57) ABSTRACT

A turbine blade for a wind turbine, the turbine blade has a blowing and suction provision in form of a plurality of arrays of blowing and suction holes defined on a curved suction surface of the turbine blade. An apparatus for turbine blade testing includes the turbine blade. The apparatus also includes a wind tunnel, a blowing source, and a suction source. The wind tunnel includes a wind channel having first and second end plates for mounting the turbine blade. A method of testing air flow in a turbine blade involves changing holes used for blowing and suction and determining a momentum coefficient for those various holes; and varying angle of attack with measurement of lift/drag ratio.

11 Claims, 17 Drawing Sheets

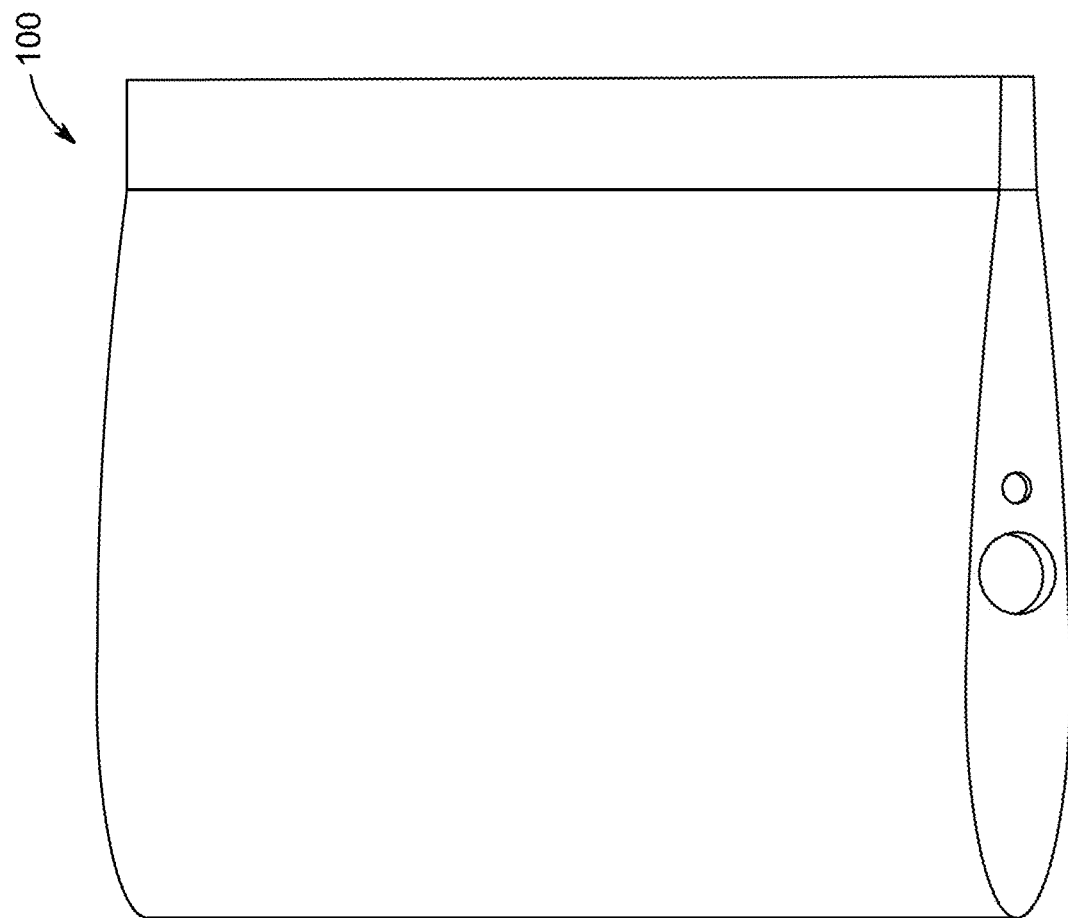

$\alpha = 14°$

TURBINE BLADE WITH CURVED SUCTION SURFACE

CROSS-REFERENCE TO RELATED APPLICATIONS

The present application is a Continuation of U.S. application Ser. No. 18/152,860, pending, having a filing date of Jan. 11, 2023.

BACKGROUND

Technical Field

The present disclosure is directed to a wind turbine blade with minimized cut-in-speed, and in particular, a wind turbine blade having blowing and suction holes in a fixed arrangement that minimizes cut-in speed and maximizes lift-to-drag ratio. The present disclosure includes an apparatus for testing various types of turbine blades with different hole positions and for measuring a momentum coefficient that characterizes the jet intensity.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Electricity is an essential part of modern life and is used for a wide variety of purposes, including lighting, heating, cooling, powering appliances, and running industrial equipment. Increase in the global population demands an increase in need for electric power to meet the energy needs of households, businesses, and industrial facilities around the world. Globally increasing population, growing power needs, and the adverse impact of climate change on human life and infrastructure due to burning of fossil fuels for power generation has become alarming. To combat the adverse effects of climate change on the human life, clean and renewable sources of energy need to be developed to harness the energy to cut down the greenhouse gases emissions into the atmosphere due to continuous fossil fuel burning. The renewable sources of energy which are commercially available include the wind (both offshore and onshore), solar (both photovoltaic and thermal), geothermal, biomass, tidal, wave, salinity gradient, and so on. Among these, wind power technology, both onshore and offshore, is technically matured and commercially acceptable.

Wind turbines are used to generate electricity from wind energy for a variety of purposes, including powering homes, businesses, and industrial facilities. Wind turbines are also used in large-scale wind farms, which are collections of wind turbines that are connected to the electric grid and can supply electricity to a large number of people. Overall, wind turbines play a vital role in the transition to a more sustainable and low-carbon energy system. With a new capacity addition of 60.0 GW (54.2 GW onshore and 6.0 GW offshore) in year 2019, the cumulative total global capacity for wind energy reached 650.0 GW, an increase of 19% compared to 2018. Further, from 2009 onwards, the annual new wind power capacity build up has always been >35 GW each year. The world's top five countries (onshore installations) in 2019 were China, USA, India, Spain, and Sweden with respective capacities contributions of 23.8 (44%), 9.2 (17%), 2.17 (4%), 2.17 (4%), and 1.63 GW (3%) [See: Lee J. and Zhao F., (2020). Global wind report 2019-GWEC, (Accessed on Jan. 12, 2021)].

There have been many advances in wind turbine technology in recent years, which have helped to make wind energy more efficient, cost-effective, and reliable. Advances in control systems have allowed wind turbines to operate more efficiently and reliably. For example, some wind turbines are now able to adjust a pitch of blades thereof in response to changing wind conditions, thereby optimizing energy production. Size of the wind turbines have grown over time, with few wind turbines now reaching heights of over 200 meters and having rotor diameters of over 200 meters. Larger wind turbines can capture more wind energy and generate more electricity, which makes them more efficient. Now, it is evident that wind turbine technology has reached to a state that the hub heights and the rotor diameters are difficult to increase further due to structural, installation, and maintenance issues. Thus, another possible approach to increase wind turbine's efficiency is to improve the design of the blades of wind turbines, with a goal of maximizing an amount of wind energy captured. Conventionally, such approaches to increase the wind turbine's efficiency involved using new materials and optimizing a shape and size of the blades.

A profile of the blade is generally selected according to a max lift-to-drag ratio (CCD) value and a thickness-to-chord ratio (t) thereof. In aerodynamics, the lift-to-drag ratio is the lift generated by an aerodynamic body (such as an airfoil) divided by the aerodynamic drag caused by moving through air and describes the aerodynamic efficiency under given flight conditions. Further, the thickness-to-chord ratio, sometimes referred to as chord ratio or thickness ratio, compares the maximum vertical thickness of a wing to its chord, and is a key measure of the performance of a wing planform when it is operating at high speeds. In order to achieve maximum performance, a value of the lift-to-drag ratio should be as high as possible. Further, in order to achieve a tip deflection that compiles to the International Electrotechnical Commission (IEC) standards, the thickness to chord ratio should be selected according to the structural analysis and optimization of the blade design.

The wind turbines generate electricity only when the wind is blowing, so they are dependent on weather conditions. In particular, cut-in speed of the wind turbine is the wind speed at which the wind turbine begins to generate electricity. This is typically around 4-5 meters per second (m/s) for most wind turbines, although it can vary depending on the specific design and size of the turbine. At wind speeds below the cut-in speed, the turbine's blades do not turn fast enough to generate electricity, so the wind turbine remains idle. Once the wind speed reaches the cut-in speed, the wind turbine starts to generate electricity, and the amount of electricity it generates increases as the wind speed increases. The cut-in speed is an important factor in the design of wind turbines, as it determines the minimum wind speed required for the turbine to generate electricity. If the cut-in speed is too high, the turbine may not generate electricity in many wind conditions, which can reduce its overall efficiency and effectiveness. Further, in areas with low average wind speeds, it may not be practical to install a wind turbine due to the low likelihood of the wind reaching the required cut-in speed.

It is one object of the present disclosure to provide turbine blade designs that have a lower cut-in speed and can operate more efficiently at low wind speeds. It is desired to have a turbine blade with provisions that provide a maximum lift while optimizing cut-in speed of the turbine blade. The present disclosure provides design of a turbine blade employing blowing and suction holes in suction surface of the turbine blade, which besides providing reduction of cut-in speed, improves the aerodynamic performance of the turbine blade by increasing the lift-to-drag ratio $C_L/C_D$. The present disclosure further describes an apparatus for turbine blade testing, and a method of testing air flow in a turbine blade to allow for designing of disclosed turbine blades.

SUMMARY

According to one aspect of the present disclosure, a turbine blade for a wind turbine is provided. The turbine blade includes a blowing and suction provision which includes a plurality of arrays of blowing and suction holes defined on a curved suction surface of the turbine blade.

In one or more exemplary embodiments, the plurality of arrays of blowing and suction holes are such that an inner diameter, spanwise distance, and number of the blowing and suction holes are fixed in an arrangement that minimizes cut-in speed of the turbine blade.

In one or more exemplary embodiments, the plurality of arrays of blowing and suction holes are such that an inner diameter, spanwise distance and number of the blowing and suction holes are fixed in an arrangement and has an angle of attack that provides a maximum lift while optimizing cut-in speed of the turbine blade.

In one or more exemplary embodiments, two arrays of the blowing and suction holes are arranged with blowing holes located 40 mm and suction holes located 120 mm away from a leading edge of the turbine blade.

In one or more exemplary embodiments, in a test mode, the 40 mm positioned holes are connected to an air compressor and the 120 mm positioned holes are connected to a vacuum pump, and the air flow rate is such that the momentum coefficient at the 40 mm positioned holes is 0.104 and the momentum coefficient at the 120 mm positioned holes is 0.07.

In one or more exemplary embodiments, there are 29 holes in each of the arrays of blowing and suction holes and a center-to-center distance between two adjacent holes is 10 mm.

In one or more exemplary embodiments, angle of attack of the turbine blade is 14 degrees.

In one or more exemplary embodiments, the turbine blade is in accordance with an NACA 0015 airfoil, in which chord length is 200 mm and span length is 300 mm.

In one or more exemplary embodiments, the turbine blade further comprises a sharp trailing edge.

In one or more exemplary embodiments, the turbine blade is configured to adjust angle of attack to give an adjustable lift-to-drag ratio ($C_L/C_D$) where $C_L$ is a lift coefficient and $C_D$ is a drag coefficient.

In one or more exemplary embodiments, in a test mode, each blowing and suction hole is connected to a tube and, for each array, the tubes are fluidly connected to a single pressure chamber having a single air supply and/or vacuum connector.

According to another aspect of the present disclosure, an apparatus for turbine blade testing is provided. The apparatus includes the turbine blade as described above. The apparatus also includes a wind tunnel, a blowing source, and a suction source. The wind tunnel includes a wind channel having first and second end plates for mounting the turbine blade.

In one or more exemplary embodiments, in a test mode, an angle of attack of the turbine blade is configurable between 0° and 25° in order to determine a maximum lift of the turbine blade.

According to yet another aspect of the present disclosure, a method of testing air flow in a turbine blade is provided. The method includes providing a turbine blade having a plurality of arrays of holes on a curved suction surface of the turbine blade. The method further includes applying air via a blowing source to a first array of the plurality of arrays of holes. The method further includes withdrawing air via a suction source to from a second array of the plurality of arrays of holes. The method further includes measuring a momentum coefficient by adjusting airflow rate of the blowing source and/or the suction source. The method further includes changing a configuration of the applying or withdrawing to a third array of the plurality of arrays of holes. The method further includes measuring the momentum coefficient for the changed configuration. The method further includes determining which of the plurality of arrays of holes have optimum blowing and suction based on the measured momentum coefficient to achieve a minimum cut-in speed of the turbine blade.

In one or more exemplary embodiments, in the method of testing, the step of applying air is made by connecting 40 mm positioned holes to an air compressor and the withdrawing air is made by connecting 120 mm positioned holes to a vacuum pump. Further, the step of measuring of the momentum coefficient includes measuring the momentum coefficient at the 40 mm positioned holes and measuring the momentum coefficient at the 120 mm positioned holes.

In one or more exemplary embodiments, the method of testing further includes determining a maximum lift of the turbine blade by adjusting angle of attack of the turbine blade between 0 and 25°.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

FIG. 1A is an assembled perspective view of a turbine blade, according to certain embodiments.

DETAILED DESCRIPTION

Figure 1B:
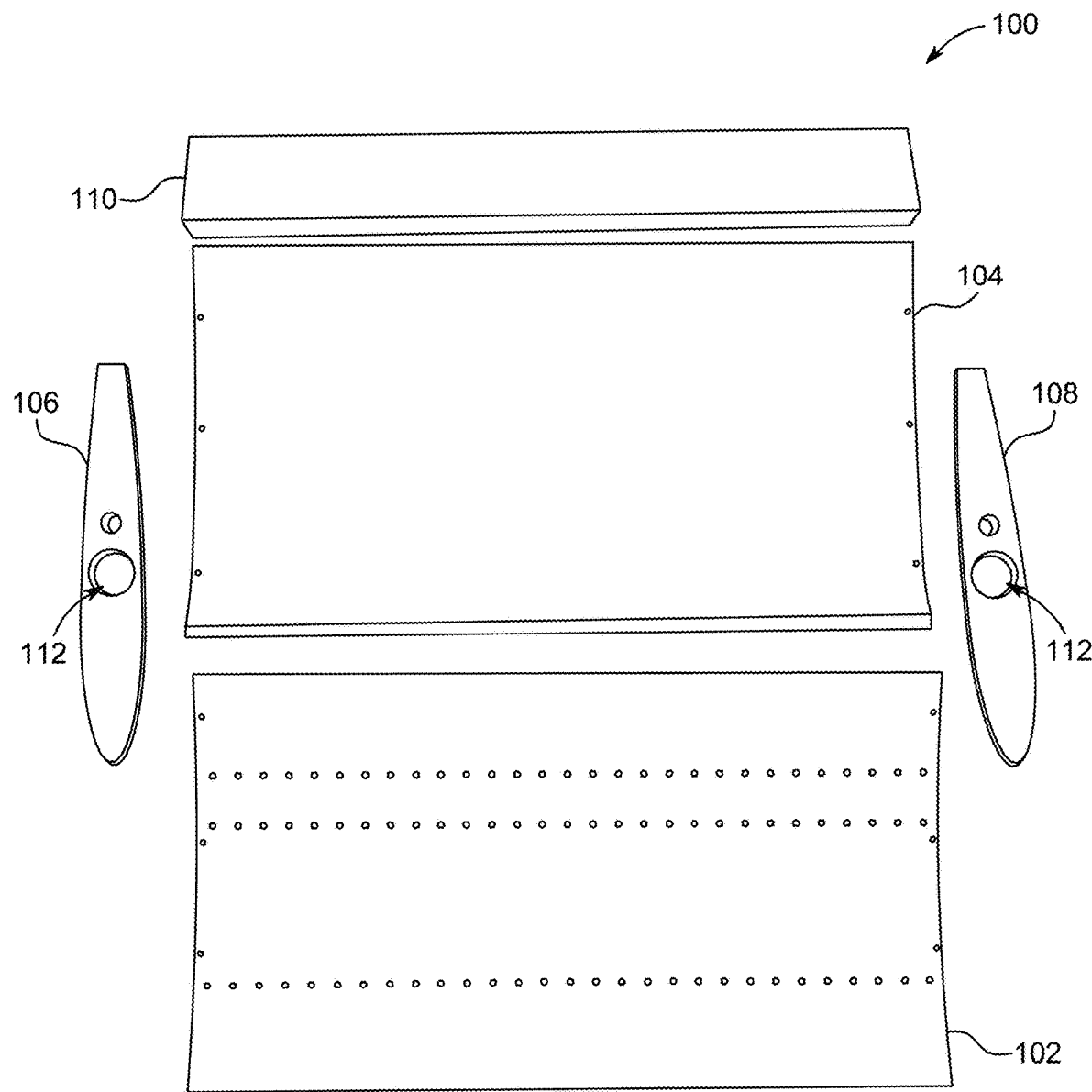
FIG. 1B is a dismantled view of the turbine blade showing individual components thereof, according to certain embodiments.
Figure 1C:
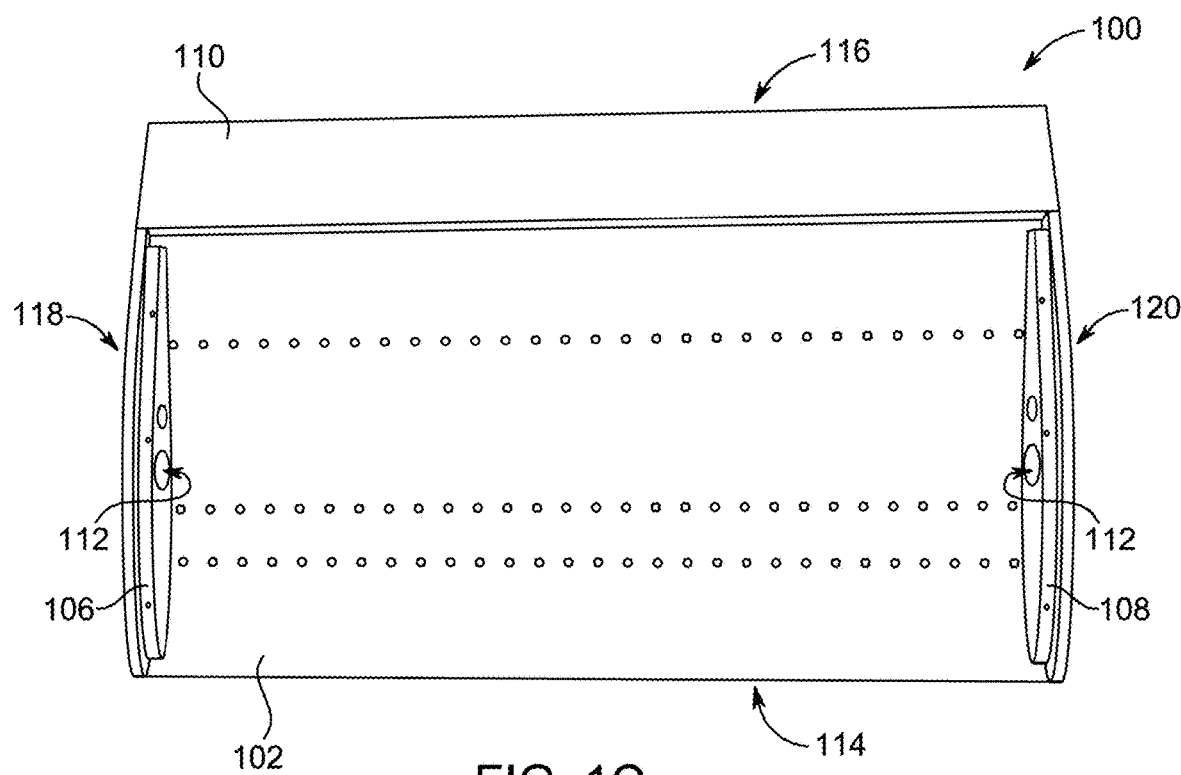
FIG. 1C is a partially dismantled view of the turbine blade with a pressure surface thereof being removed, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

An object of the present disclosure is to enhance efficiency of a turbine blade by modifying the turbine blade in a way to decrease a cut-in-speed thereof. In particular, the turbine blade can start up at a lower cut-in-speed which allows for more frequent revolution at low wind speeds and thereby more energy generation by a wind turbine. The cut-in-speed is reduced by improving an aerodynamic performance of an airfoil employing a jet control concept to alter the wind flow around the airfoil. In the present disclosure, the performance improvement of the airfoil is achieved using active and passive flow control and is proved experimentally.

Aspects of the present disclosure are directed to a turbine blade for a wind turbine, where the turbine blade includes a blowing and suction provision, an apparatus for turbine blade testing, and a method of testing air flow in a turbine blade. The present disclosure is aimed at examining experimentally an active flow control of the turbine blade via the blowing and suction provisions to delay boundary separation in the turbine blade. The present disclosure further provides verification of the proposed design of the turbine blade by (a) investigation of aerodynamic performance of the turbine blade under varying blowing and suction conditions, such as blowing and suctions locations and momentum coefficient '$C_\mu$'; (b) optimization of the blowing and suction parameters to achieve the best aerodynamic performance; and (c) exploration of underlying mechanism for the optimization of blowing and suction conditions.

Referring to FIGS. 1A-1E, in combination, illustrated are different views of a turbine blade (as represented by reference numeral 100), according to certain embodiments of the present disclosure. The turbine blade 100 (also interchangeably referred to as "an airfoil") is implemented in a wind turbine (not shown) which is a device that converts the wind's kinetic energy into electrical energy. The wind turbine includes three main components: a rotor, a generator, and a tower. The turbine blade 100 is part of the rotor in the wind turbine. The rotor may utilize two or three turbine blades 100 that are mounted on a rotor hub, which is connected to a shaft that runs through a center of a turbine. The generator is the part of the wind turbine that converts the mechanical energy of the rotating shaft into electrical energy. Further, the tower is the part of the wind turbine that supports the rotor and the generator. The turbine blade 100 is designed to capture the wind's kinetic energy and convert such captured energy into mechanical energy, which is then used to generate electricity. The turbine blade 100 is typically made of composite materials such as fiberglass, carbon fiber, or a combination of both. These materials are chosen for their strength, durability, and low weight, which helps to reduce the load on the rotor and improve the efficiency of the wind turbine. Overall, the turbine blade 100 is designed to be as efficient as possible at capturing and converting the wind's kinetic energy into electricity.

As illustrated in FIG. 1B, the turbine blade 100 includes a suction surface 102, a pressure surface 104, two lateral plates including a first lateral plate 106 and a second lateral plate 108, and a trailing edge part 110. The suction surface 102 of the turbine blade 100 faces the wind and is designed to capture maximum energy from the wind. The pressure surface 104 of the turbine blade 100 is opposite to the suction surface 102 and is subjected to high pressure as the wind passes thereover. The suction surface 102 and the pressure surface 104 are in the form of curved hoods, and thus also referred to as "curved suction surface 102" and "curved pressure surface 104" without any limitations. The suction surface 102 and the pressure surface 104 define regions of the turbine blade 100 that experience pressure forces as the turbine blade 100 moves through the air. The suction surface 102 is the part of the turbine blade 100 that experiences a decrease in pressure as the turbine blade 100 moves through the air. Such decrease in pressure creates a lift force on the turbine blade 100, which helps to generate power from the wind. The suction surface 102 is typically located on the underside of the turbine blade 100, facing away from the direction of the wind. The pressure surface 104 is the part of the turbine blade 100 that experiences an increase in pressure as the turbine blade 100 moves through the air. Such increase in pressure is caused by the movement of air over the surface of the turbine blade 100. The pressure surface 104 is typically located on the upper side of the turbine blade 100, facing towards the direction of the wind. The lateral plates 106, 108 are located on the sides of the turbine blade 100 and are used to couple the suction surface 102 and the pressure surface 104 together. The lateral plates 106, 108 help increase the stiffness and strength of the turbine blade 100, and also help distribute load more evenly throughout the turbine blade 100 to reduce the risk of failure due to fatigue or other types of stress. In present examples, as shown, the lateral plates 106, 108 define apertures 112 to route tubes therethrough to an inside of the turbine blade 100, as discussed later in the description. The trailing edge part 110 is located at a rear edge of the turbine blade 100.

The turbine blade 100 has a leading edge 114 which is a front edge of the turbine blade 100, and a trailing edge 116 which is the rear edge of the turbine blade 100. The leading edge 114 and the trailing edge 116 play an important role in the performance of the turbine blade 100, and the wind turbine in general. There are several factors that can affect the performance of the leading edge 114 and the trailing edge 116, including shape, thickness, and materials used for construction thereof. The leading edge 114 and the trailing edge 116 are responsible for controlling the airflow over the turbine blade 100 and helps to ensure that the turbine blade 100 is able to capture maximum energy from the wind. It may be seen that, in the turbine blade 100, the lateral plates 106, 108 are disposed perpendicular to the leading edge 114 and the trailing edge 116. Further, the trailing edge part 110 is located at the trailing edge 116 as it is subjected to significant aerodynamic forces. The trailing edge part 110 is often made from materials that are strong and resistant to wear, such as fiberglass or carbon fiber, to withstand the loads and stresses that are applied to the trailing edge 116 during operation, without failing or deforming. In the present embodiments, the turbine blade 100 includes a sharp trailing edge. That is, the trailing edge part 110 is designed to have the trailing edge 116 to be sharp in the turbine blade 100.

Figure 1E:
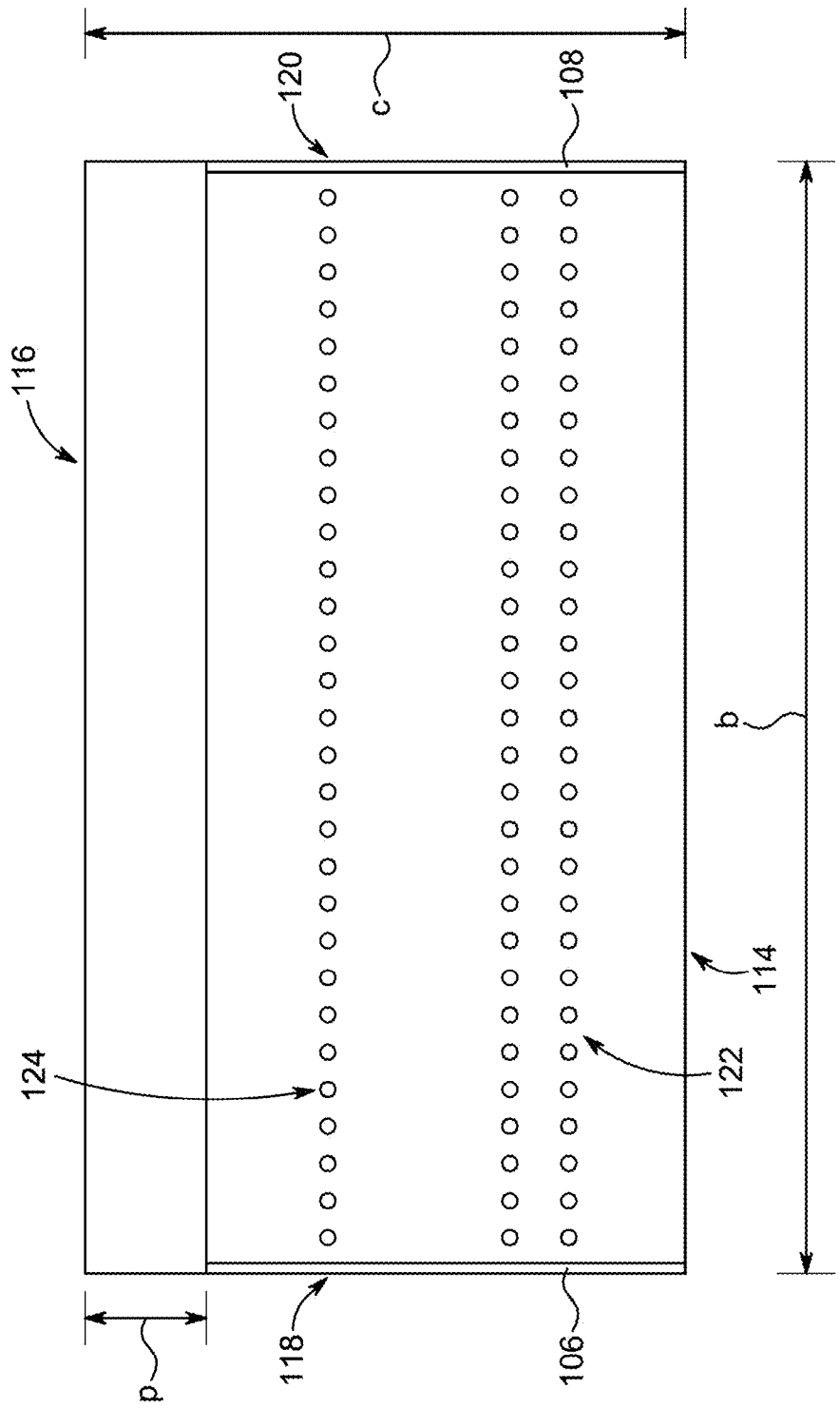
FIG. 1E is a planar view of the turbine blade, according to certain embodiments.
Figure 2:
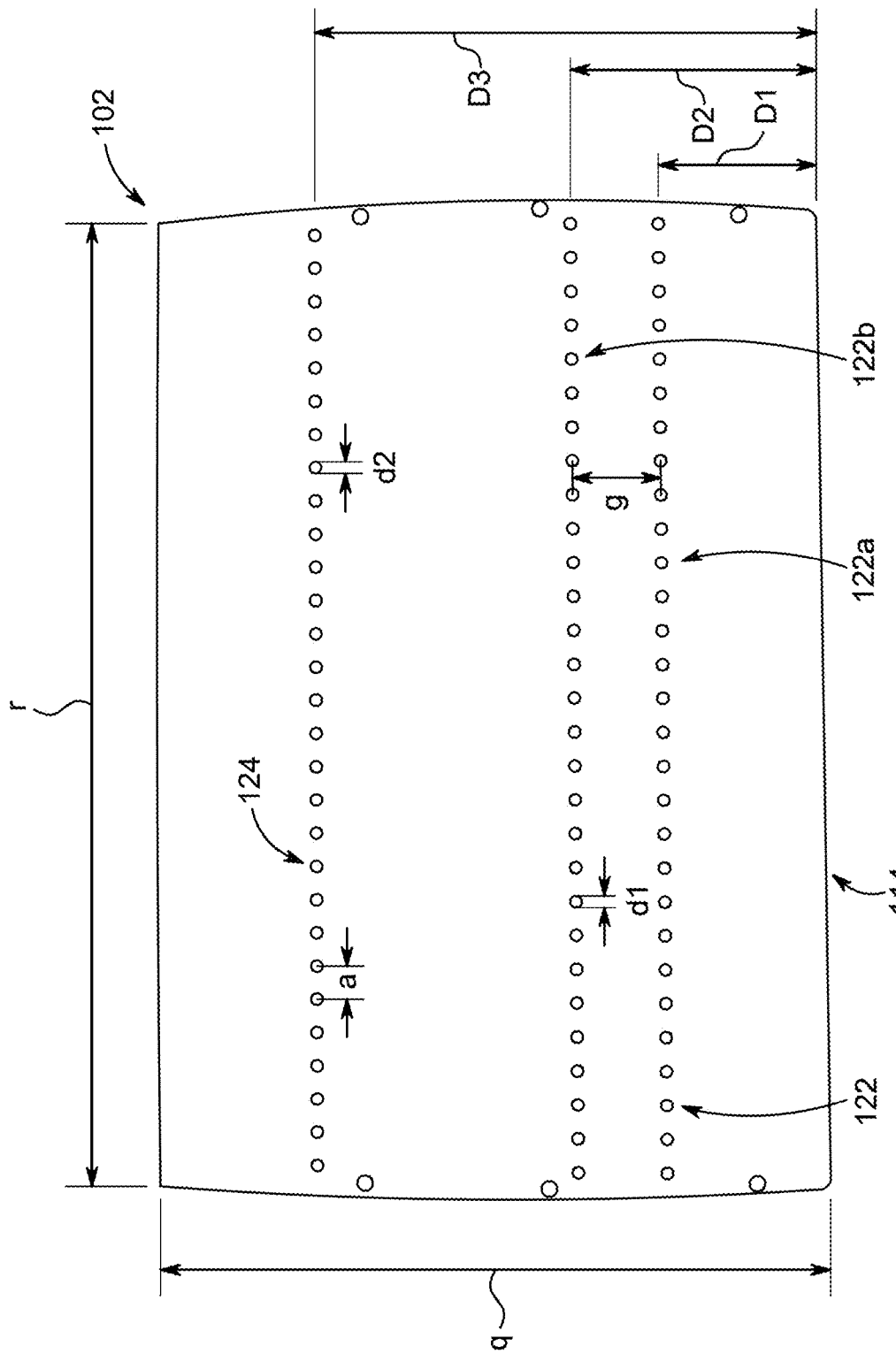
FIG. 2 is a perspective view of a suction surface of the turbine blade, according to certain embodiments.

Further, in the turbine blade 100, a chord length 'c' (see FIG. 1E) is a distance from the leading edge 114 to the trailing edge 116 of the turbine blade 100, and a span length 'b' is a distance from a root 118 (which is part closest to the rotor hub, e.g., the first lateral plate 106) to a tip 120 (which is part farthest from the rotor hub, e.g., the second lateral plate 108) of the turbine blade 100. The chord length 'c' and the span length 'b' are also important factors in the design and performance of the turbine blade 100. In the turbine blade 100, the chord length 'c' is designed to be as long as possible in order to maximize the amount of energy that can be captured from the wind. The span length 'b', on the other hand, is designed to be as short as possible in order to reduce the weight and cost of the turbine blade 100. In an embodiment, the chord length 'c' for the turbine blade 100 is 200 mm and the span length 'b' for the turbine blade 100 is 300 mm. Further, the trailing edge part 110 may have a length 'p', along the chord length 'c', of about 40 mm; and the lateral plates 106, 108 may have width, along the span length 'b', of about 3 mm each. Thereby, as shown in FIG. 2, the suction surface 102 and the pressure surface 104 may have surface chord lengths 'q', along the chord length 'c', of about 160 mm, and surface span lengths 'r', along the span length 'b', of about 294 mm. The turbine blade 100 also has a camber (not represented in drawings) which represents its curvature and is measured as a maximum deviation of the turbine blade 100 from a straight line drawn from the leading edge 114 to the trailing edge 116. The turbine blade 100 is designed to have a low to moderate camber in order to balance the trade-off between lift and drag.

Figure 1D:
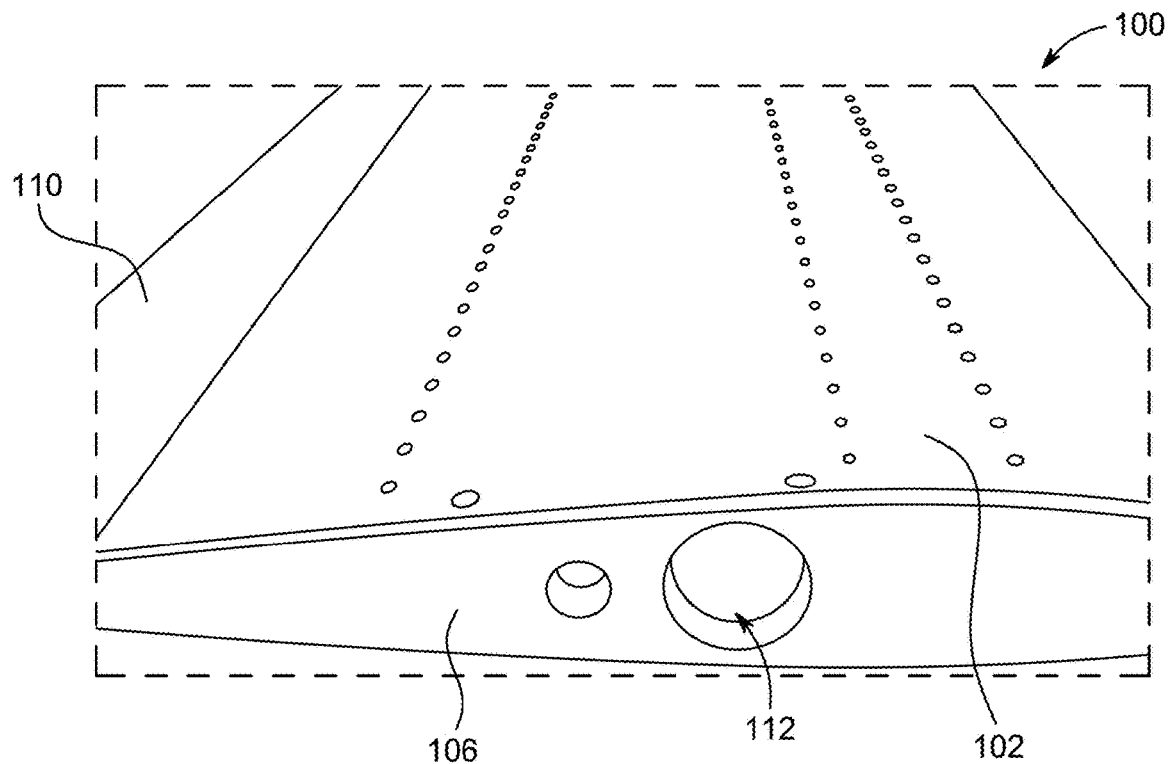
FIG. 1D is a partial side view of the turbine blade with the pressure surface thereof being removed, according to certain embodiments.

In general, the shape of the turbine blade 100 is designed to maximize the amount of energy that may be captured from the wind. As shown in FIG. 1A and FIG. 1D, the turbine blade 100 is a long, slender, curved structure. In particular, the turbine blade 100 is curved like an airfoil, which means that the turbine blade 100 is thicker in the middle and tapers towards ends (as discussed later in more detail). Such shape helps the turbine blade 100 to generate lift, which, in turn, allows the turbine blade 100 to capture maximum wind energy. In the present embodiments, the turbine blade 100 is in accordance with an NACA (National Advisory Committee for Aeronautics) 0015 airfoil. The NACA 0015 airfoil is a symmetrical airfoil that is commonly used in wind turbine design. The NACA 0015 airfoil is characterized by its smooth, rounded leading edge and relatively flat trailing edge. The NACA 0015 airfoil is known for its good lift-to-drag ratio and low drag coefficients at low to moderate angles of attack. This makes the NACA 0015 well suited for use in applications where low drag and good lift are important, such as in the turbine blade 100. The NACA 0015 airfoil is described using a four-digit identifier, with the first two digits representing the maximum camber as a percentage of the chord (the distance from the leading edge to the trailing edge) and the last two digits representing the maximum thickness as a percentage of the chord length 'c'. In the case of the NACA 0015 airfoil, the maximum camber is 0% and the maximum thickness is 15% of the chord length 'c', hence the name.

According to embodiments of the present disclosure, the turbine blade 100 has a blowing and suction provision. For this purpose, as shown in FIG. 1E, the turbine blade 100 includes a plurality of arrays of blowing holes (as represented by reference numeral 122) and suction holes (as represented by reference numeral 124) on the curved suction surface 102 of the turbine blade 100. In the present disclosure, the blowing holes 122 and the suction holes 124 have also been referred to as "blowing slots" and "suction slots" respectively, and further the array of blowing holes 122 and the array of suction holes 124 have been collectively referred to as "arrays of holes" without any limitations. The blowing holes 122 and the suction holes 124 are used to control the flow of air over the turbine blade 100. The blowing holes 122 and the suction holes 124 are used in combination in the design of the turbine blade 100 to optimize the performance thereof and improve overall efficiency of the wind turbine. In particular, the blowing holes 122 are used to blow air out of the turbine blade 100. The blowing holes 122 are located proximal to the leading edge 114 of the turbine blade 100, where the airflow is highest. By blowing air out of the turbine blade 100, it is possible to alter the flow of air over the curved suction surface 102 of the turbine blade 100 and improve its performance (as discussed later). Further, the suction holes 124 are used to draw air into the turbine blade 100. The suction holes 124 are typically located proximal to trailing edge 116 of the turbine blade 100, where the airflow is lower. By drawing air into the turbine blade 100, it is possible to create a low-pressure region on the curved suction surface 102 of the turbine blade 100, which can help to reduce drag and improve the efficiency of the turbine blade 100.

Referring to FIG. 2, the curved suction surface 102 is illustrated. As shown, the blowing holes 122 and the suction holes 124 are defined in the curved suction surface 102. In some examples, the blowing holes 122 and the suction holes 124 are defined by capillaries, e.g., steel, thermoplastic polymer or thermoset polymer, (not shown) embedded into the curved suction surface 102. Such steel capillaries may be in the form of small tubes or pipes, made of stainless steel or the like, to aid airflow for the blowing holes 122 and the suction holes 124 in the turbine blade 100. The use of capillaries for the blowing holes 122 and the suction holes 124 may help to improve performance of the turbine blade 100 by providing a controlled and reliable airflow.

For purposes of the present disclosure, the plurality of arrays of holes are such that an inner diameter (as represented by 'd1' and 'd2'), spanwise distance (as represented by 'D1', 'D2' and 'D3') and number of the blowing holes 122 and the suction holes 124 are fixed in an arrangement that minimizes cut-in speed of the turbine blade 100. As used herein, the cut-in speed of the turbine blade 100 is the wind speed at which the turbine blade 100 begins to turn fast enough to generate electricity. Thereby, the cut-in speed determines the minimum wind speed required for the turbine blade 100 to contribute to electricity generation in the wind turbine. It is desirable to minimize the cut-in speed of the turbine blade 100 so that it can operate more efficiently at low wind speeds. The inner diameter 'd1' is a diameter of each of the blowing holes 122 and the inner diameter 'd2' is a diameter of each of the suction holes 124. In an example, the inner diameter 'd1' is 1.0 mm and the inner diameter 'd2' is 1.5 mm. In other embodiments the inner diameters d1 and d2 may be from 0.5 to 4.0 mm, preferably 0.8 to 2 mm, although the d1 is preferably smaller than d2.

In one or more embodiments, as illustrated, the array of blowing holes 122 includes two rows of blowing holes 122 including a first row of blowing holes 122a (comparatively closer to the leading edge 114) and a second row of blowing holes 122b (comparatively farther to the leading edge 114). Preferably the holes of both rows of blowing holes 122 is located within ½ the length c. In the present disclosure, the first row of blowing holes 122a is also referred to as "first array," the array of suction holes 124 is also referred to as "second array," and the second row of blowing holes 122b is also referred to as "third array," without any limitations. The spanwise distance 'D1' is distance of the first row of blowing holes 122a from the leading edge 114 of the turbine blade 100 along the span length 'b', the spanwise distance 'D2' is distance of the second row of blowing holes 122b from the leading edge 114 of the turbine blade 100 along the span length 'b', and the spanwise distance 'D3' is distance of the suction holes 124 from the leading edge 114 of the turbine blade 100 along the span length 'b'. Further, the first row of blowing holes 122a and the second row of blowing holes 122b has a gap distance 'g' therebetween.

In an embodiment, two arrays of the holes are arranged with the blowing holes 122 located 40 mm and the suction holes 124 located 120 mm away from the leading edge 114 of the turbine blade 100, e.g., preferably blowing holes 122 are located 25-50 mm or 30-35 mm and the suction holes 124 are located 100-140 mm or 110-130 mm away from the leading edge 114 of the turbine blade 100. Therefore, the spanwise distance 'D1' is 40 mm (e.g., ±5 mm), the spanwise distance 'D2' is 60 mm (e.g., ±5 mm) and the spanwise distance 'D3' is 120 mm (e.g., ±5 mm), and the gap distance 'g' is 20 mm (e.g., ±5 mm). That is, the first row of blowing holes 122a, the second row of blowing holes 122b and the suction holes 124 are located 40 mm (0.2c), 60 mm (0.4c) and 120 mm (0.6c) (with 'c' being the chord length) away from the leading edge 114, respectively. Further, in an embodiment, there are 29 holes in each of the arrays of holes. That is, each of the array of blowing holes 122 and the array of suction holes 124, respectively, has 29 holes therein. Furthermore, in the case of the array of blowing holes 122 including two rows, each of the first row of blowing holes 122a and the second row of blowing holes 122b, respectively, has 29 holes therein. A center-to-center distance (as represented by 'a') between two adjacent holes (of each of the array of blowing holes 122 and the array of suction holes 124) is 10 mm. The above described configuration of the turbine blade 100 minimizes the cut-in speed thereof, to provide an optimal performance when implemented in the wind turbine, as has been supported by experimental data provided later in the description. The dimensions and the number of holes for the turbine blade 100 described and illustrated herein are exemplary and should not be construed as limiting the present disclosure.

Further, for purposes of the present disclosure, the plurality of arrays of holes are such that the inner diameter 'd1' and 'd2', the spanwise distance 'D1', 'D2' and 'D3' and the number of the blowing holes 122 and the suction holes 124 are fixed in an arrangement and has an angle of attack (represented by 'α' in some of the figures) that provides a maximum lift while optimizing the cut-in speed of the turbine blade 100. As used herein, the angle of attack 'α' for the turbine blade 100 refers to an angle between a chord line (an imaginary line drawn from the leading edge 114 to the trailing edge 116) and a direction of the wind. The angle of attack 'α' is an important factor in determining the lift and drag forces that the turbine blade 100 experiences, which in turn affect the power output and efficiency of the wind turbine. For instance, a positive angle of attack results in an upward lift force and a downward drag force for a typical turbine blade, which can help to generate more power in the wind turbine; however, if the angle of attack becomes too large, the typical turbine blade may stall, resulting in a loss of lift and an increase in drag, which, in turn, may reduce the wind turbine's efficiency.

The turbine blade 100 of the present disclosure is designed with the angle of attack 'α' optimized to maximize the power output while minimizing the risk of stalling. In some examples, the angle of attack 'α' may be adjustable by control system of the wind turbine in order to optimize performance under different wind conditions. In an embodiment, the values of the inner diameter 'd1' and 'd2', the spanwise distance 'D1', 'D2' and 'D3' and the number of the blowing holes 122 and the suction holes 124 are same as described in the preceding paragraph. In such case, the angle of attack 'α' of the turbine blade 100 is set to be 14 degrees (alternately from 12-16 degrees or 13-15 degrees), to provide an optimal performance when implemented in the wind turbine, as has been supported by experimental data provided later in the description. The value of the angle of attack mentioned herein is exemplary and should not be construed as limiting the present disclosure. Further, in an embodiment, the turbine blade 100 is configured to adjust angle of attack to give an adjustable lift-to-drag ratio '$C_L/C_D$', where '$C_L$' is a lift coefficient and '$C_D$' is a drag coefficient. As used herein, the lift-to-drag ratio '$C_L/C_D$' is representative of a lift generated by the turbine blade 100 divided by aerodynamic drag caused by moving of the turbine blade 100 through air. The above discussed configuration of the turbine blade 100 provides a maximum lift while optimizing the cut-in speed thereof.

Figure 3:
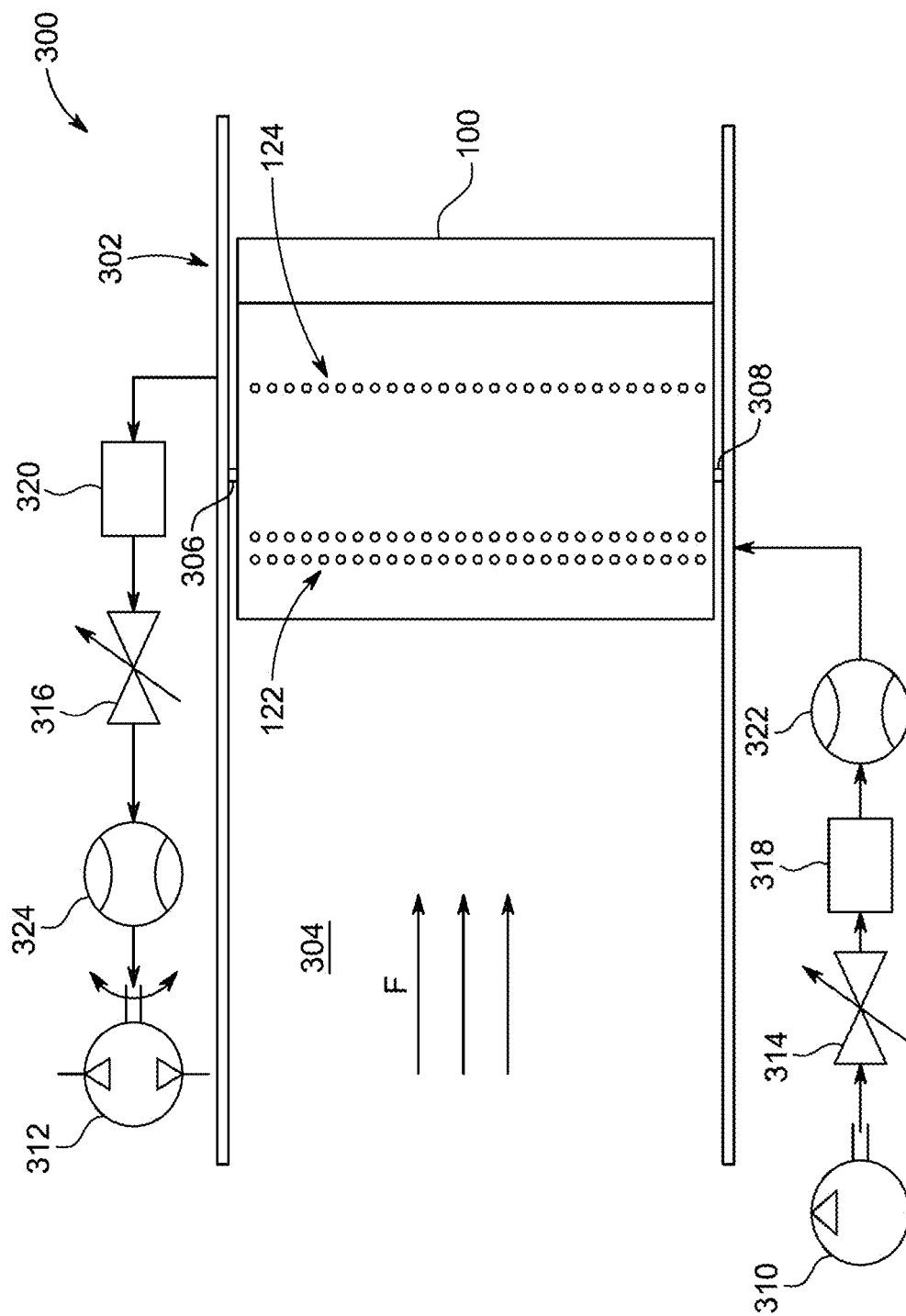
FIG. 3 is a schematic diagram of an apparatus for turbine blade testing, according to certain embodiments.

Referring to FIG. 3, illustrated is a schematic diagram of an apparatus (as represented by reference numeral 300) for turbine blade testing, that is testing of the turbine blade 100 of the present disclosure. In FIG. 3, the turbine blade 100 is shown installed in the apparatus 100. The apparatus 300 includes a wind tunnel 302. The wind tunnel 302 includes a wind channel 304 having first and second end plates 306, 308 for mounting the turbine blade 100. The wind tunnel 302 is a device that generates a controlled air flow (as represented by 'F'), in the wind channel 304, and thus may be used for testing the performance of the turbine blade 100 under a range of different wind speeds and angles of attack. The wind tunnel 302 may be used to test a variety of performance characteristics of turbine blade 100, including lift and drag forces, power output, and efficiency.

The apparatus 300 further includes a blowing source 310 and a suction source 312. In an example, the blowing source 310 is an air compressor, with the terms being interchangeably used hereinafter. Further, in an example, the suction source 312 is a vacuum pump, with the terms being interchangeably used hereinafter. By using the blowing source 310, air is blown through the blowing holes 122 of the turbine blade 100; and by using the suction source 312, air is drawn from the suction holes 124 of the turbine blade 100. As shown, the blowing source 310 is supported by a valve 314 (such as a butterfly valve) to shut-off flow of air from the blowing source 310, as required. Similarly, the suction source 312 is supported by a valve 316 (such as a butterfly valve) to shut-off flow of air to the suction source 312, as required. In some examples, a pressure chamber 318 is provided with the blowing source 310 to regulate the air flow therefrom, and a pressure chamber 320 is provided with the suction source 312 to regulate the air flow thereto. Further, a flowmeter 322 is provided with the blowing source 310 to measure and control air flow therefrom, and a flowmeter 324 is provided with the suction source 312 to measure and control air flow thereto. The illustrated arrangement of the apparatus 300 is exemplary and components thereof may possibly be arranged in a different manner, without departing from the scope of the present disclosure.

Figure 4A:
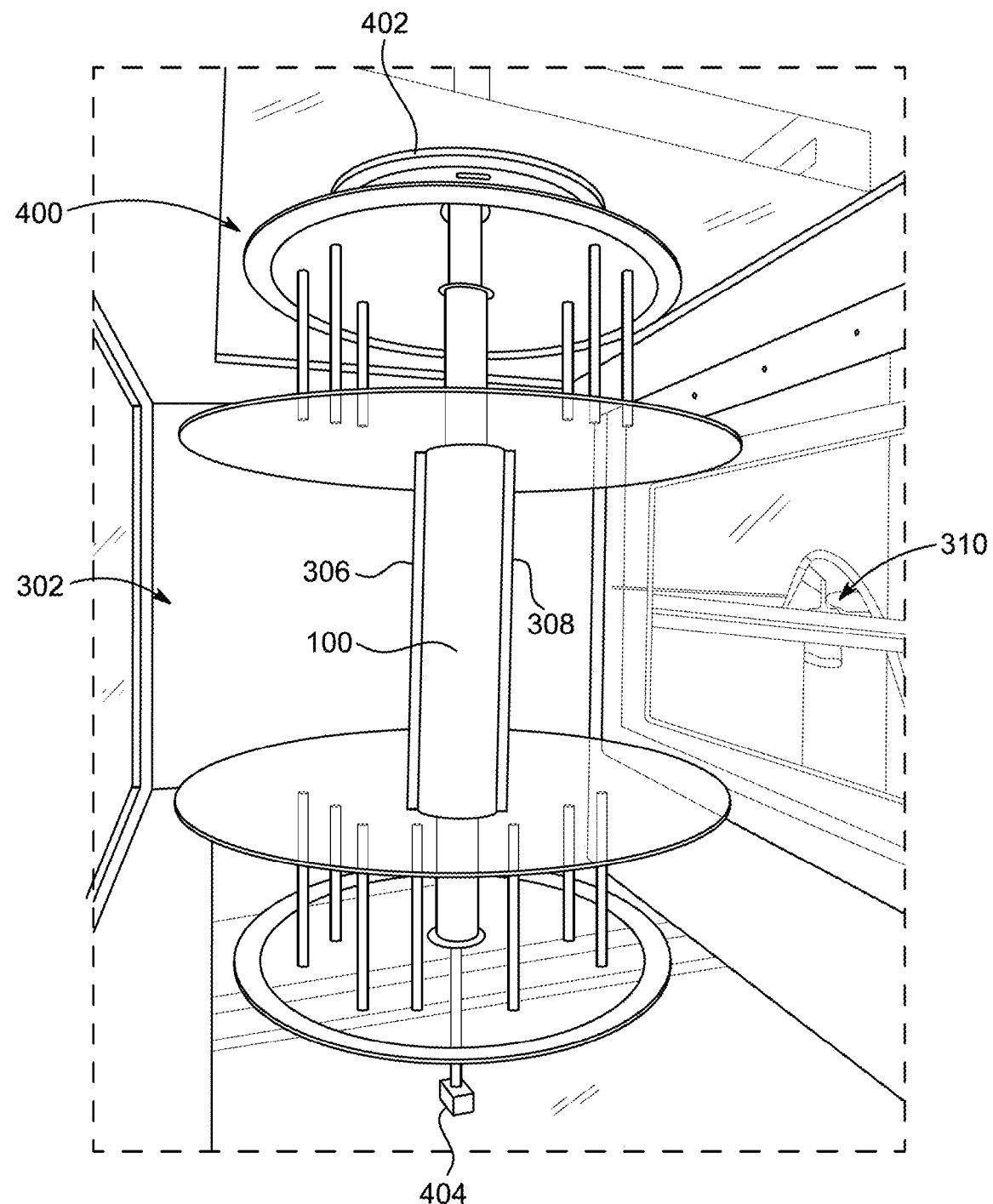
FIG. 4A is an exemplary test rig for the apparatus for turbine blade testing with the turbine blade installed therein, according to certain embodiments.
Figure 4B:
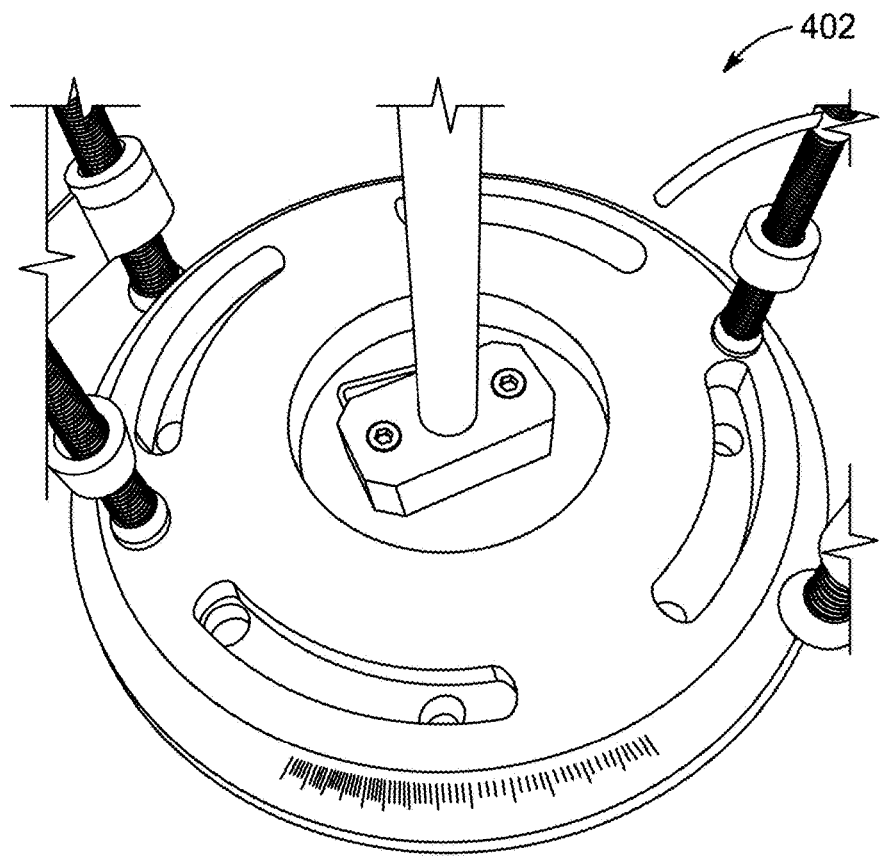
FIG. 4B is an exemplary illustration of a rotary table dial utilized in the test rig for the apparatus for turbine blade testing, according to certain embodiments.
Figure 4C:
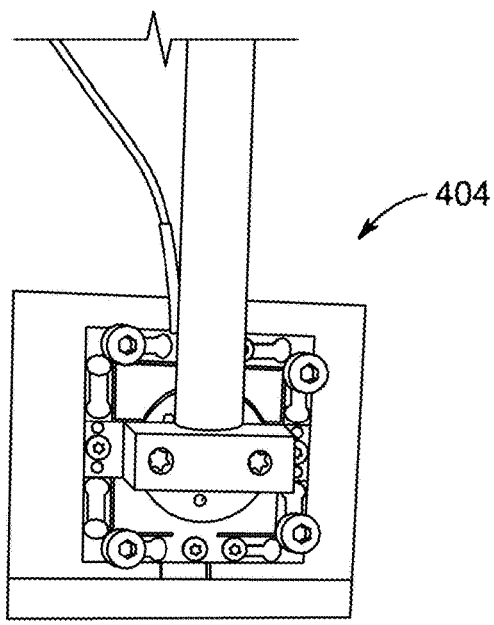
FIG. 4C is an exemplary illustration of a load cell utilized in the test rig for the apparatus for turbine blade testing, according to certain embodiments.

Referring to FIG. 4A, illustrated is an exemplary test rig 400, as part of the apparatus 300, for turbine blade testing with the turbine blade 100 installed therein. The test rig 400 is disposed inside the wind tunnel 302, which in the present illustration is depicted as a glass box. In an example, the air compressor, which acts as the blowing source 310, is also located in the wind tunnel 302. The test rig 400 is in the form of a supporting platform for mounting of the turbine blade 100. In particular, as shown, the test rig 400 provides the first and second end plates 306, 308 in the form of pitching pivots (or pitch/pivot mount as known in the art) for mounting the turbine blade 100 vertically. The test rig 400 further provides a rotary dial 402 to adjust the angle of attack for the air flow 'F'. The angle of attack of the turbine blade 100 may be adjusted manually or automatically. In particular, the rotary dial 402 may change orientations of the first and second end plates 306, 308, and thereby the orientation of turbine blade 100, and thus its angle with respect to the air flow 'F' which corresponds to the angle of attack. FIG. 4B illustrates a detailed view of the rotary dial 402. The rotary dial 402, as used, is known in the art and thus details thereof are not described herein for brevity of the present disclosure. The test rig 400 also provides a load cell 404 for measuring time-averaged lift force '$F_L$' and drag force '$F_D$' acting on the turbine blade 100. FIG. 4C illustrates a detailed view of the load cell 404. In an example, the load cell 404 is a three-component load cell (such as, by Interface 3A60-20N) having a measuring range of +10N, and error of less than 0.05% F.S. In some examples, an amplifier (such as, BSC4A) may also be used to magnify an output signal from the load cell 404. The sampling frequency of force measurements by the load cell 404 is 1000 Hz, and the sampling time is 30 s. The major sources of the uncertainties of the force measurements include statistical uncertainties in output of the load cell 404, freestream velocity measurement, and calibration. The relative uncertainties in the measurements of streamwise and lateral velocity components are <0.2%. The fluctuating voltage output of the load cell 404 may lead to the individual force of ±0.004 N while the uncertainty of the freestream velocity is observed to be about 0.1%. Overall, the maximum uncertainties are estimated as about 2.2% and 3.0% for '$C_L$' and '$C_D$', respectively. The measurements from the load cell 404 facilitates calculation of the time-averaged lift coefficient '$C_L$' (as $C_L=2F_L/\rho U_\infty^2 bc$), the time-averaged drag coefficient '$C_D$' (as $C_D=2F_D/\rho U_\infty^2 bc$), and therefrom the lift-to drag-ratio '$C_L/C_D$', where 'ρ' is the air density and '$U_\infty$' is the coming flow velocity.

Figure 4D:
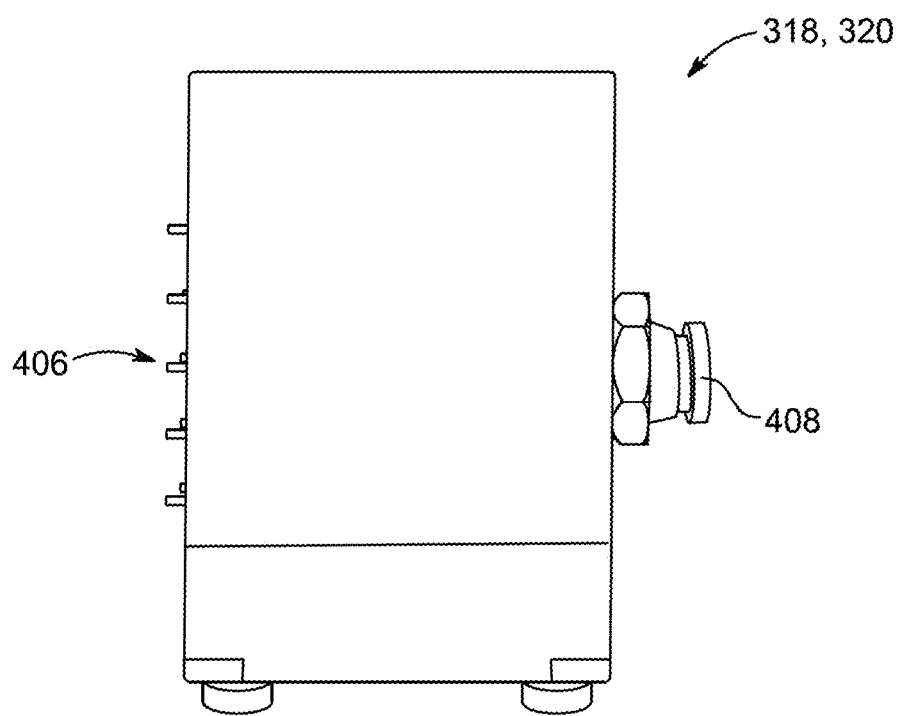
FIG. 4D is an exemplary top planar view of a pressure chamber utilized in the apparatus for turbine blade testing, according to certain embodiments.
Figure 4E:
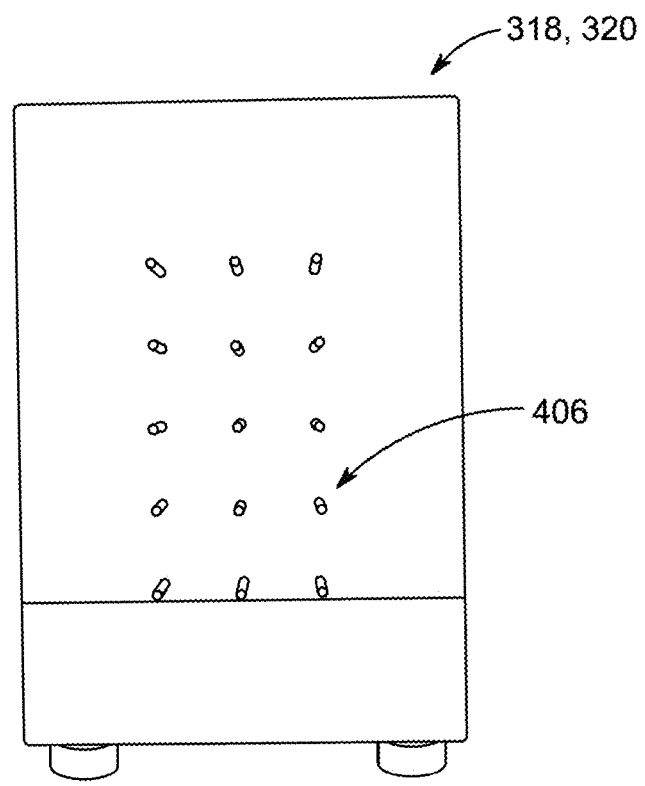
FIG. 4E is an exemplary side planar view of the pressure chamber, according to certain embodiments.
Figure 4F:
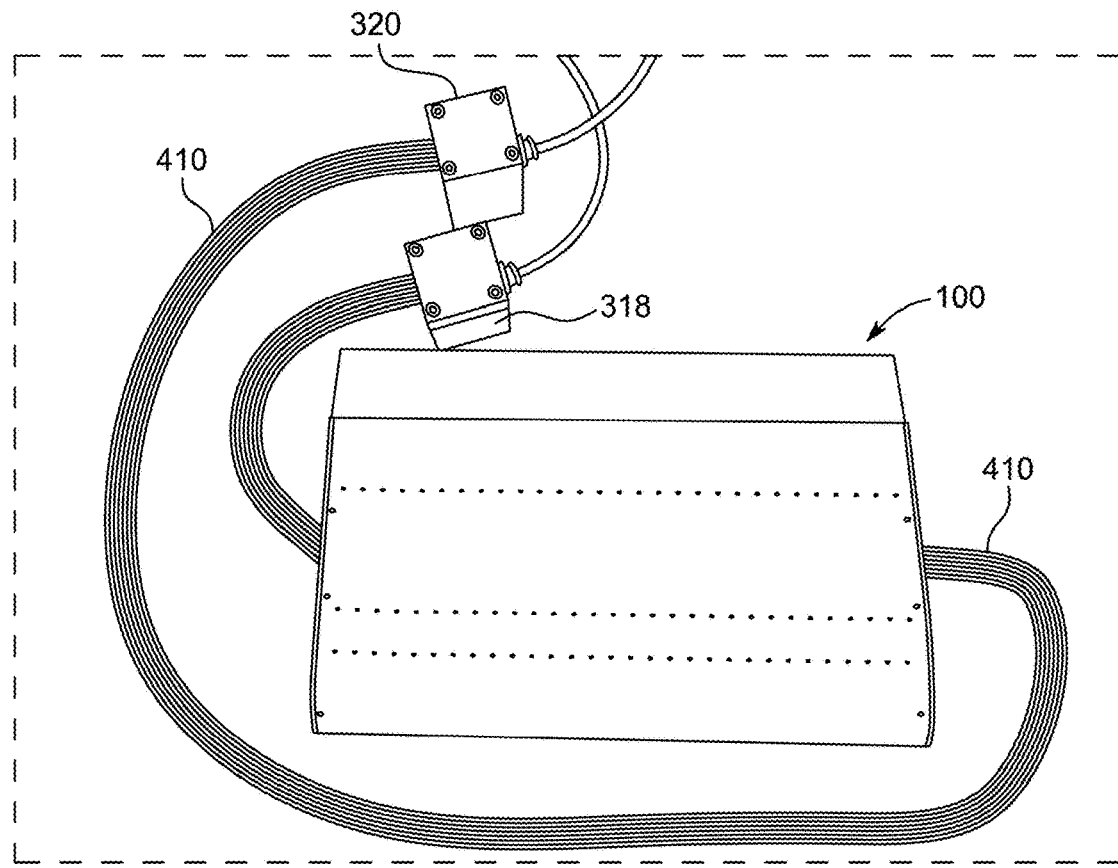
FIG. 4F is an exemplary illustration depicting connections to the pressure chambers from the turbine blade in the apparatus for turbine blade testing, according to certain embodiments.
Figure 4G:
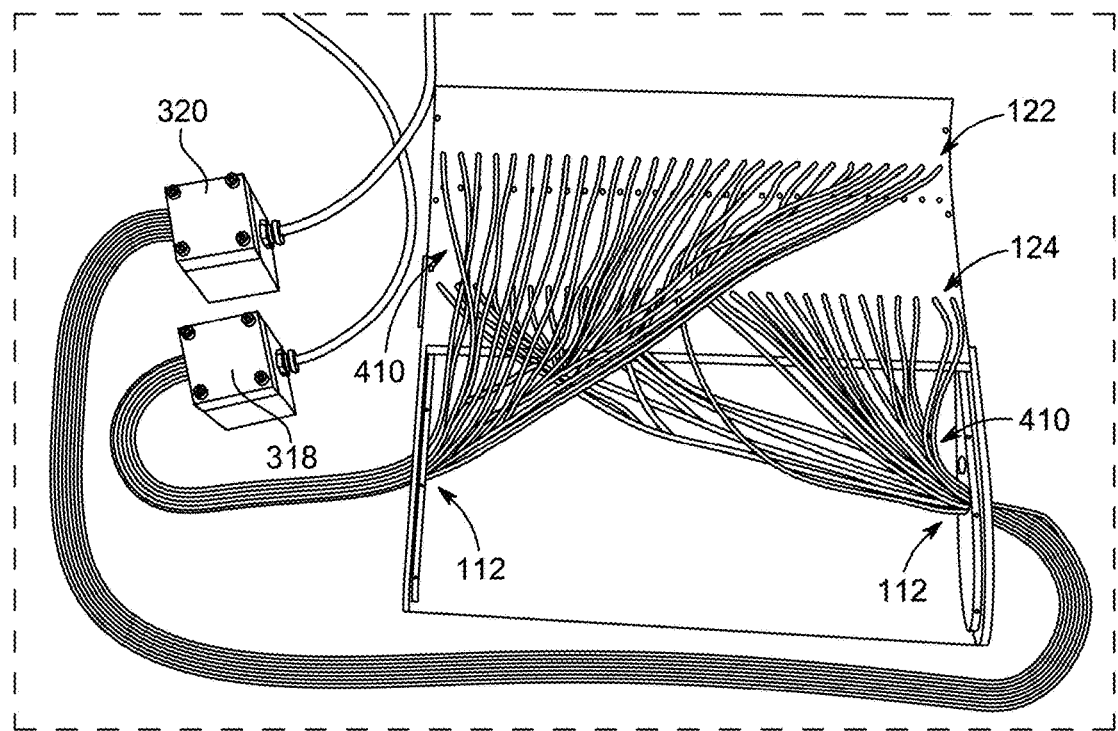
FIG. 4G is an exemplary detailed illustration depicting connections between the pressure chambers and blowing and suction holes from inside of the turbine blade in the apparatus for turbine blade testing, according to certain embodiments.

Referring to FIGS. 4D and 4E, illustrated are different views of the pressure chamber (as any one of the pressure chambers 318, 320). The pressure chambers 318, 320 are equipped to ensure that the blowing holes 122 and the suction holes 124 in each array are provided with uniform air flow rate. In an example, the pressure chamber 318 may be provided with 5 or higher number of contraction chambers to ensure the uniformity of blowing jet. Further, in an example, each of the pressure chambers 318, 320 has 15 number of openings 406. As shown, each of the pressure chambers 318, 320 has a single connector 408, with the pressure chamber 318 using the connector 408 for air supply (from the blowing source 310) and the pressure chamber 320 using the connector 408 for generating vacuum (from the suction source 312). In a test mode, as shown in FIG. 4F and FIG. 4G, each blowing hole 122 and each suction hole 124 is connected to a tube 410 and, for each array of the blowing holes 122 and the suction holes 124, the tubes 410 are fluidly connected to the openings 406 in the respective pressure chambers 318, 320. In an example, the tubes 410 may be any one of flexible polyethylene tubes or silicone tubes without any limitations. Further, referring to FIGS. 4F and 4G, illustrated are exemplary diagrams depicting connections to the pressure chambers 318, 320 from the turbine blade 100. As shown, a hollow space inside the turbine blade 100 is used for accommodating connections between the tubes 410 and the blowing holes 122 and the suction holes 124. Also, as may be seen, the tubes 410 are routed through the apertures 112 in the lateral plates 106, 108 of the turbine blade 100 to be connected to the respective pressure chambers 318, 320.

The apparatus 300, with the test rig 400, is designed to investigate the effect of combined blowing and suction on aerodynamic performance of turbine blade 100. In a test mode, the turbine blade 100 is modeled as a NACA 0012 airfoil (airfoil 100) that is widely serving as the turbine blade for wind turbines. The airfoil 100 has a chord length 'c' of 200 mm and a span length 'b' of 300 mm, giving an aspect ratio 'b/a' of 1.5. The airfoil 100 is composed such that the lateral plates 106, 108 and the trailing edge part 110 is made of aluminum (as manufactured by CNC machining), and the suction surface 102 and a pressure surface 104 are in the form of two 2 mm-thick cambered hoods made of Acrylonitrile-butadiene-styrene (ABS) (as manufactured by 3D printing). When assembled, the suction surface 102 and the pressure surface 104, as cambered hoods, form 80% of the respective surfaces on a suction side and a pressure side of the airfoil 100, and the other 20% is formed by the trailing edge part 110. Three rows of holes 122a, 122b, 124 are made at 0.2c, 0.3c, and 0.6c measured from the leading edge 114, respectively. The holes 122a, 122b, 124 are drilled through the upper cambered hood and are normal to surface of the airfoil 100. The inner diameter of each stainless steel capillary tube inserted in the holes 122a, 122b located at 0.2c and 0.3c is 1.0 mm and each stainless steel capillary tube inserted in the holes 124 at 0.6c are 1.5 mm. There are 29 holes in each row, and the spanwise center-to-center distance between two adjacent holes is 10 mm; the holes in a row cover 93.3% of the span length 'b' of the airfoil 100. These holes 122a, 122b, 124 act as the blowing and suction passages, depending on the specific control configuration. The blowing and suction holes 122a, 122b, 124 are connected to the air compressor 310 and the vacuum pump 312 by tubes 410, respectively. In particular, the blowing holes 122a (at 0.2c) and the suction holes 124 (at 0.6c) are connected to the air compressor 310 and the vacuum pump 312, respectively. The blowing holes 122b (at 0.4c) are alternatively connected to the air compressor 310 or the vacuum pump 312, depending on the control scheme.

Figure 5A:
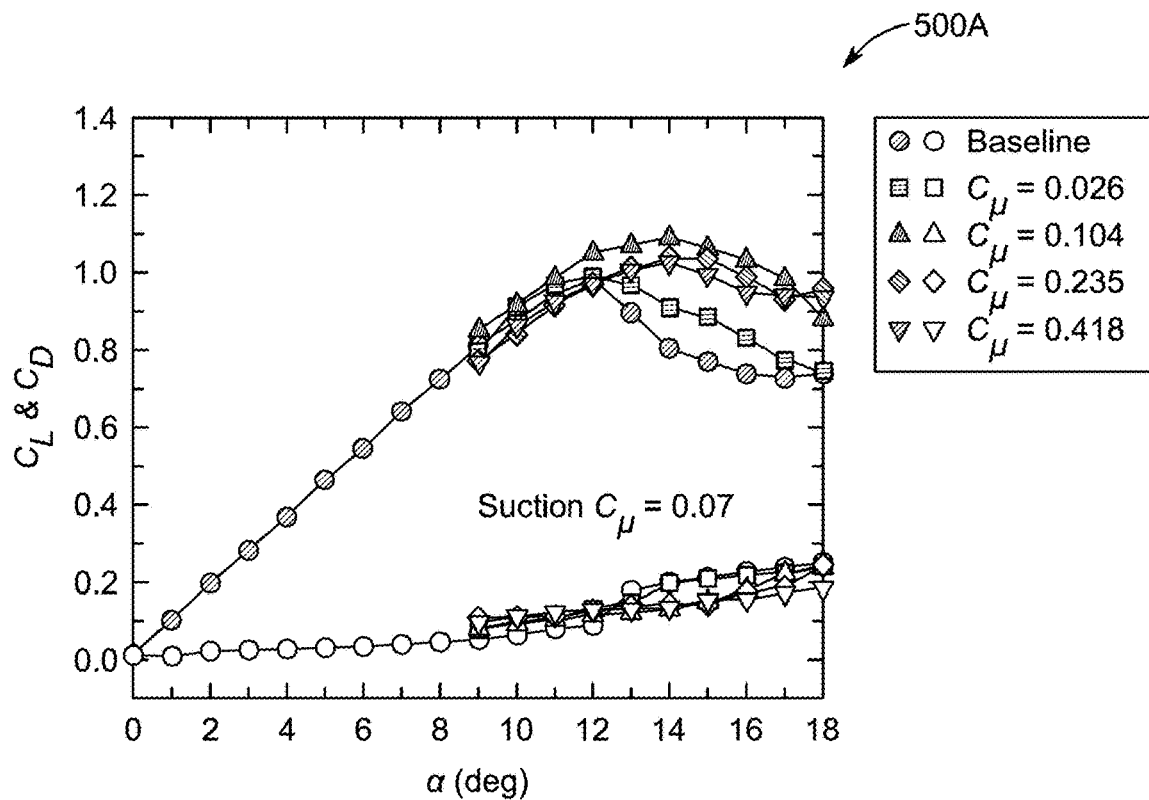
FIG. 5A is a graph depicting dependence of lift coefficient '$C_L$' and drag coefficient '$C_D$' on a momentum coefficient '$C_\mu$' of blowing jet with varying angle of attack '$\alpha$' on the turbine blade in the apparatus for turbine blade testing, according to certain embodiments.
Figure 5B:
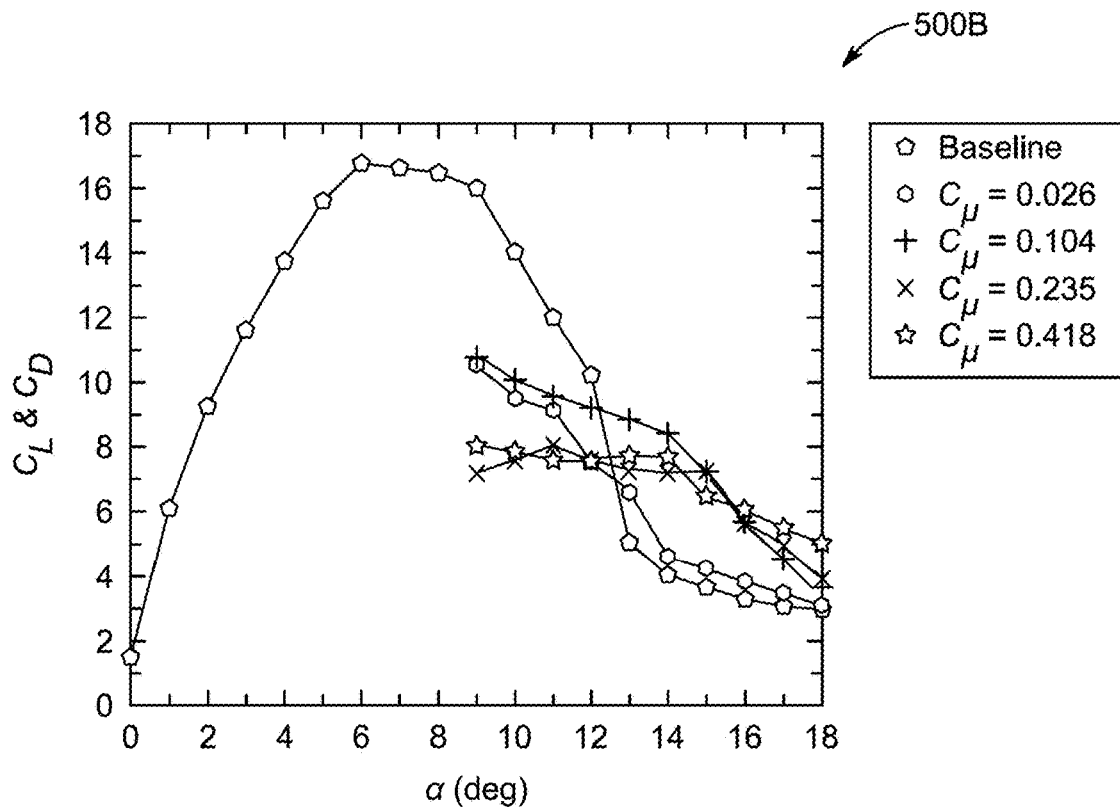
FIG. 5B is a graph depicting dependence of lift-to-drag ratio '$C_L/C_D$' on the momentum coefficient '$C_\mu$' of the blowing jet with the varying angle of attack '$\alpha$' on the turbine blade in the apparatus for turbine blade testing, according to certain embodiments.

FIG. 5A is a graph 500A depicting dependence of lift coefficient '$C_L$' and drag coefficient '$C_D$' on a momentum coefficient '$C_\mu$' of blowing jet with varying angle of attack 'α' on the turbine blade 100 in the apparatus 300, according to certain embodiments. FIG. 5B is a graph 500B depicting dependence of lift-to-drag ratio '$C_L/C_D$' on the momentum coefficient '$C_\mu$' of the blowing jet with the varying angle of attack 'α' on the turbine blade in the apparatus for turbine blade testing, according to certain embodiments. In the graphs 500A and 500B, solid and hollow symbols (legends) indicate the lift and the drag of airfoil 100, respectively. In a test mode, the 40 mm positioned holes 122a are connected to the air compressor 310 and the 120 mm positioned holes 124 are connected to the vacuum pump 312, and the air flow rate is such that the momentum coefficient '$C_\mu$' at the 40 mm positioned holes 122a is 0.104 and the momentum coefficient '$C_\mu$' at the 120 mm positioned holes 124 is 0.07.

Further, in a test mode, the angle of attack 'α' of the turbine blade 100 is configurable between 0 and 25° in order to determine the maximum lift of the turbine blade 100. That is, the angle of attack 'α' is varied from 0° to 25°. The angle of attack 'α' is adjusted manually by the rotary dial 402 bolted on the test rig 400. The maximum uncertainty in the angle of attack 'α' was taken as 0.25 deg. The time-averaged lift force '$F_L$' and drag force '$F_D$' are measured using the load cell 404 mounted at the bottom end of the test rig 400. On the other hand, 'Ur' is fixed at 7.8 m/s and the corresponding Reynolds number is $1.0\times10^5$. As shown, a momentum coefficient '$C_\mu$' (as determined by equation $C_\mu=2M_j/\rho U_\infty^2 bc$, where '$M_j$' is the jet flow mass, 'ρ' is the air density and '$U_\infty$' is the coming flow velocity) for the blowing holes 122 is 0.026, 0.104, 0.235 and 0.418, and for the suction holes 124 is 0.07. The optimum control case of blowing ($C_\mu$=0.104) at 0.2c and suction ($C_\mu$=0.07) at 0.6c is confirmed with best effect on improving the aerodynamic performance of the turbine blade 100. Under control of the optimum case, $C_L$ (as $C_L=2F_L/\rho U_\infty^2 bc$) and $C_L/C_D$ (with $C_D=2F_D/\rho U_\infty^2 bc$) increased by 35% and 123%, respectively, as Reynolds number equals to $1.0\times10^5$ ($U_\infty$=7.8 m/s).

Figure 6A:
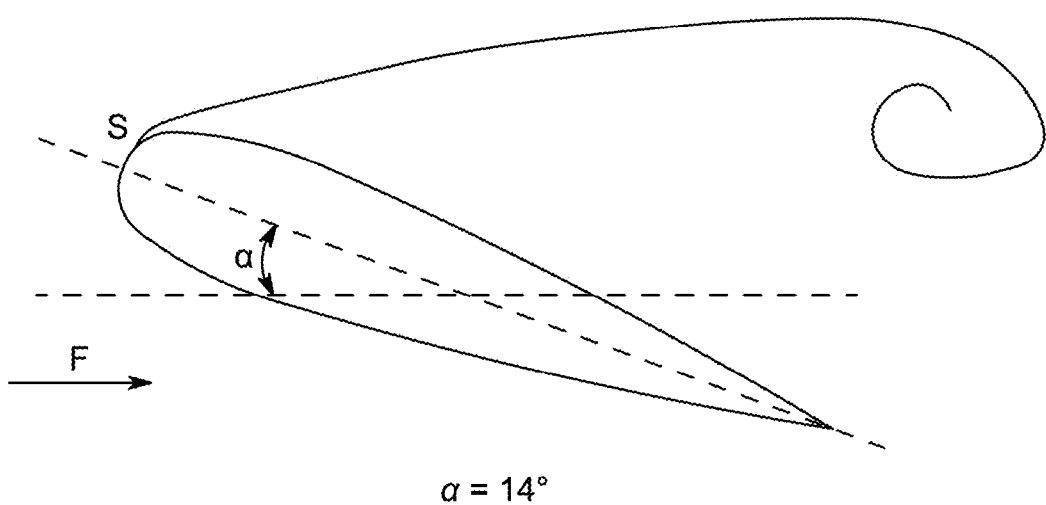
FIG. 6A is a schematic diagram depicting flow above a suction surface of a base line turbine blade model.
Figure 6B:
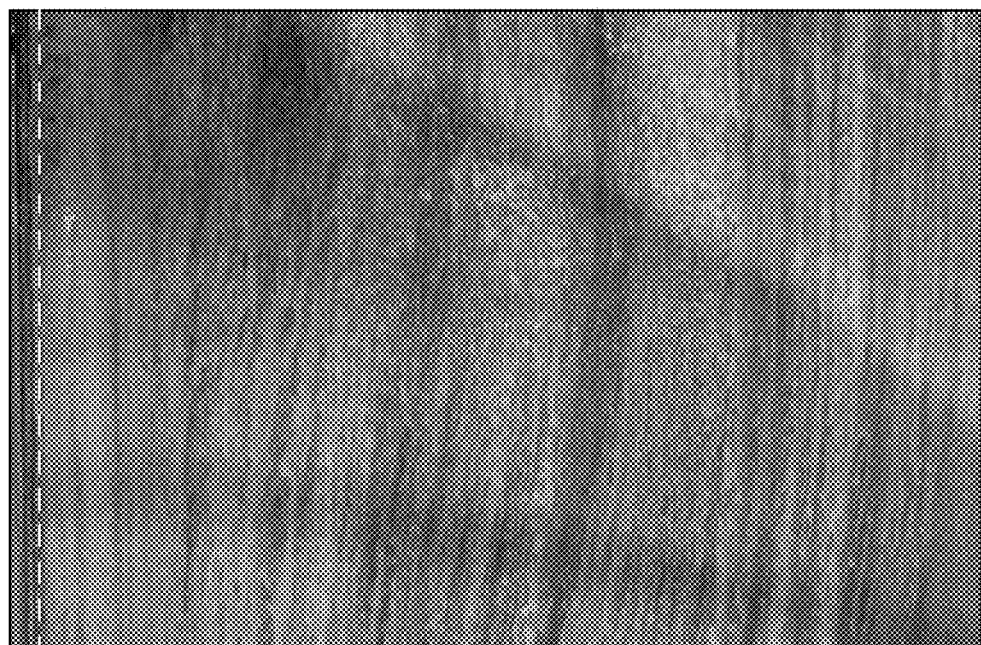
FIG. 6B is a pictorial representation for flow visualization above the suction surface of the base line turbine blade model.
Figure 7A:
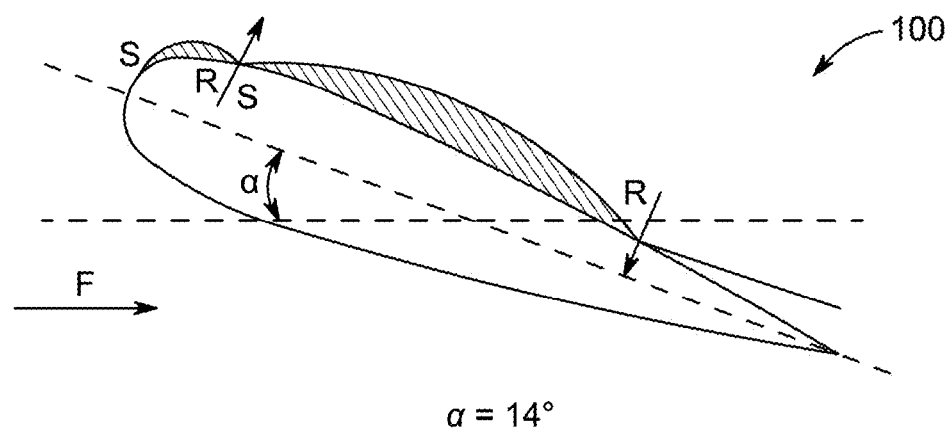
FIG. 7A is a schematic diagram depicting flow above the suction surface of the turbine blade, according to certain embodiments.
Figure 7B:
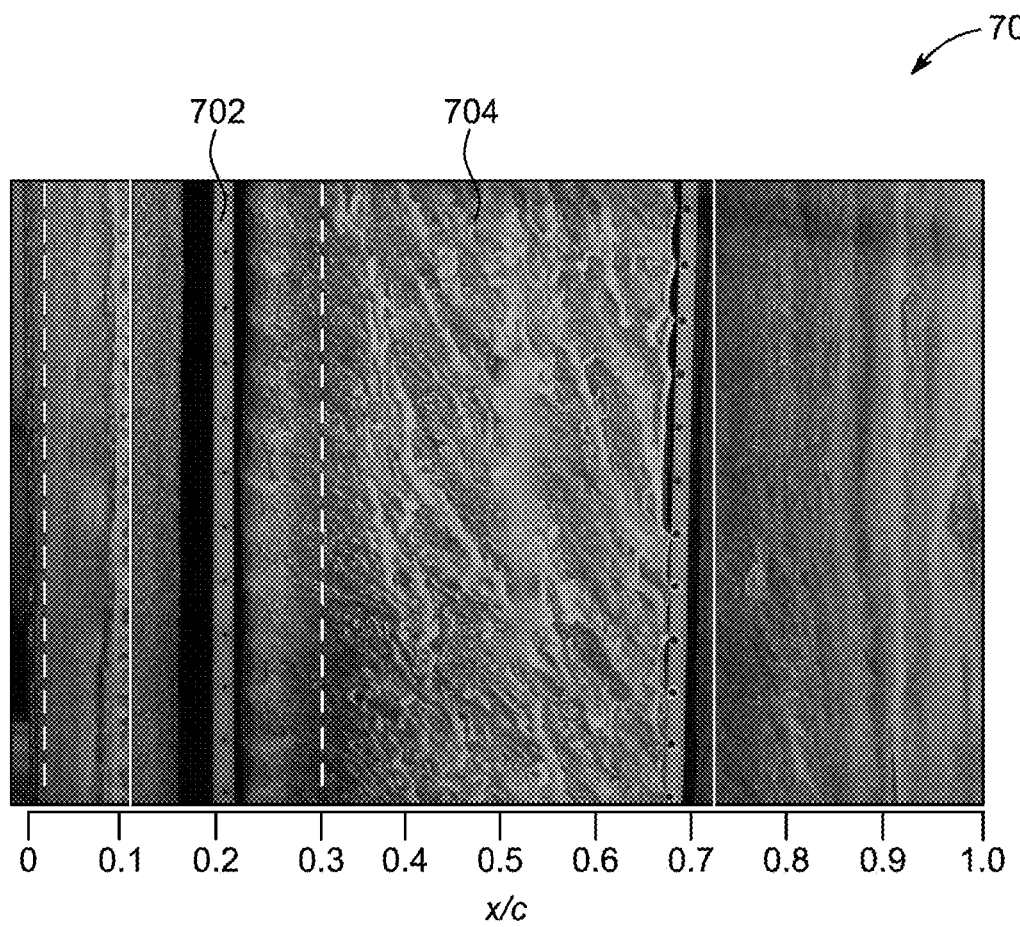
FIG. 7B is a pictorial representation for flow visualization above the suction surface of the turbine blade, according to certain embodiments.

Further, FIGS. 6A and 6B illustrates flow above a suction surface of a base line turbine blade model, whereas FIGS. 7A and 7B illustrate flow above the suction surface 102 of the turbine blade 100 of the present disclosure. As shown, a surface oil flow visualization technique is used to study the flow near the suction surface of the turbine blade 100. In an example, the solution used in the measurement is the mixture of titanium dioxide, silicon oil, dodecane and oleic acid with a specific ratio of 6 g:20 ml:12 ml:8 ml. As shown in a pictorial representation 700 of the surface oil flow visualization measurement of FIG. 7B, the turbine blade 100 of the present disclosure provides mechanisms for the improved lift based on the force reattachment of separated shear layer 702 and formation of separation bubble 704. In the representations of FIGS. 7A and 7B, the dashed and solid lines indicate the separation and reattachment lines, respectively; 'S' and 'R' indicates separation and reattachment points, respectively; and the hatch region indicates the separation bubble 704.

Furthermore, as per embodiments of the present disclosure, the $F_L$ for the turbine blade 100 may also be controlled by optimizing reduction of air flow (as provided in Table 1 below). In an example, the cut-in speed of wind turbine blade may be reduced by 15.38% at α=16° by implementation of the present disclosure. The maximum lift for the turbine blade 100 under control is achieved at α=14° (highlighted in Table 1), and the corresponding reduction of cut-in speed is 13.97%.

TABLE 1

The reduction of effective coming flow velocity achieved by the proposed flow control method at different angles of attack.

| α | 10° | 11° | 12° | 13° | 14° | 15° | 16° | 17° | 18° |
|---|---|---|---|---|---|---|---|---|---|
| Effective velocity (m/s) | 7.61 | 7.58 | 7.54 | 7.10 | 6.71 | 6.64 | 6.60 | 6.72 | 7.15 |
| Reduction (%) | 2.44 | 2.82 | 3.33 | 8.97 | 13.97 | 14.87 | 15.38 | 13.85 | 8.33 |

It may be understood that besides the locations of the blowing holes 122 and the suction holes 124, another major parameter that has been investigated in the present disclosure is the momentum coefficient $C_\mu$ characterizing the jet intensity, i.e., $$C_\mu = \frac{\dot{m}_j V_j}{0.5 \rho U_\infty^2 S}$$

where '$\dot{m}_j$' is the mass flow rate of blowing or suction jet; '$V_j$' is the bulk velocity of jet; 'S' is the projected airfoil area; '$\rho$' and '$U_\infty$' are the density and velocity of the freestream flow, respectively. The '$\dot{m}_j$' is adjusted by a pressure regulator and measured with a rotameter. The accuracy of the rotameter is specified as 3% of the full scale. The spanwise variation of '$C_\mu$' was less than 5% across the central 93.3% span of the turbine blade 100. The overall uncertainty of '$C_\mu$' measurement was estimated as 8%. The '$C_{\mu b}$' and '$C_{\mu s}$' indicate the momentum coefficients of the blowing holes 122 and the suction holes 124, respectively.

Figure 8A:
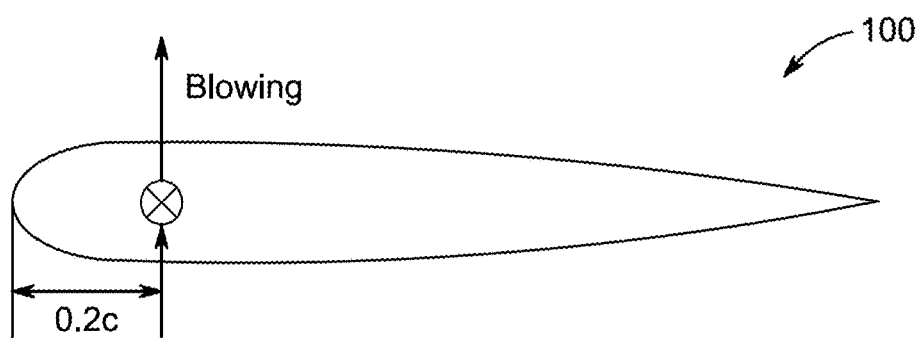
FIG. 8A is a schematic diagram of the turbine blade as per a first control case with the blowing holes located at 0.2c ('c' being chord length of the turbine blade) for measuring effect on a momentum coefficient '$C_\mu$' for the turbine blade, according to certain embodiments.
Figure 8B:
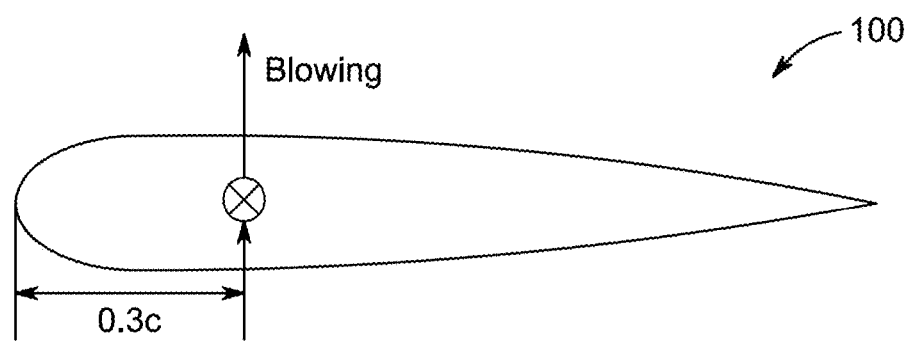
FIG. 8B is a schematic diagram of the turbine blade as per a second control case with the blowing holes located at 0.3c for measuring effect on the momentum coefficient '$C_\mu$' for the turbine blade, according to certain embodiments.
Figure 8C:
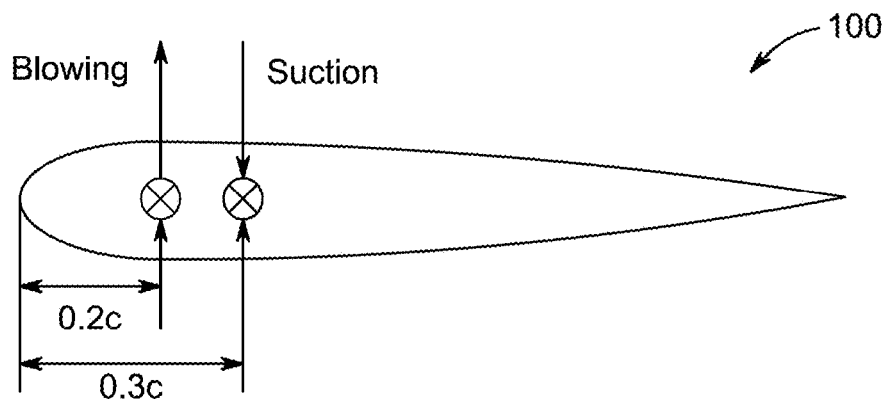
FIG. 8C is a schematic diagram of the turbine blade as per a third control case with the blowing holes located at 0.2c and the suction holes located at 0.3c for measuring effect on the momentum coefficient '$C_\mu$' for the turbine blade, according to certain embodiments.
Figure 8D:
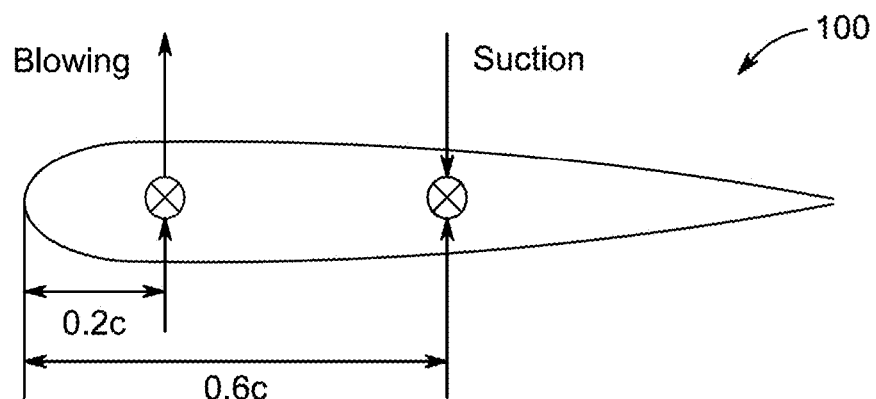
FIG. 8D is a schematic diagram of the turbine blade as per a fourth control case with the blowing holes located at 0.2c and the suction holes located at 0.6c for measuring effect on the momentum coefficient '$C_\mu$' for the turbine blade, according to certain embodiments.
Figure 8E:
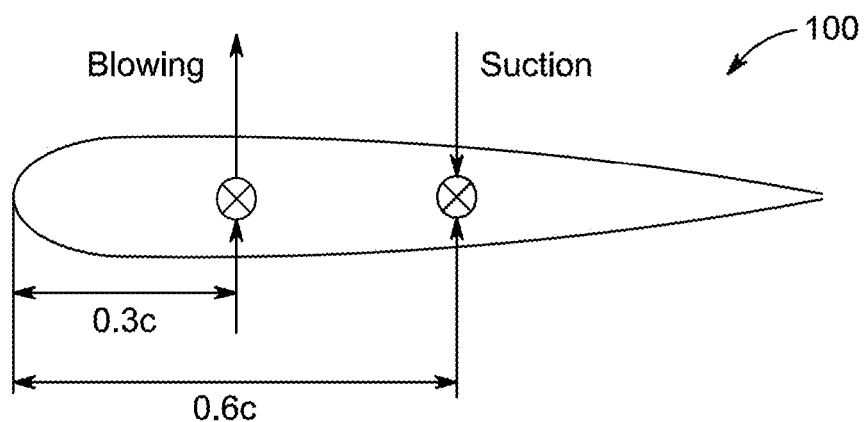
FIG. 8E is a schematic diagram of the turbine blade as per a fifth control case with the blowing holes located at 0.3c and the suction holes located at 0.6c for measuring effect on the momentum coefficient '$C_\mu$' for the turbine blade, according to certain embodiments.

FIGS. 8A-8E are schematic diagrams of the turbine blade 100 as per different control cases with the blowing holes 122 and/or the suction holes 124 being located at different positions along the chord length 'c' of the turbine blade 100 for measuring effect on the momentum coefficient '$C_\mu$' therefor. The values of '$C_{\mu b}$' for control cases of FIGS. 8A and 8B are 0.026, 0.104, 0.235 and 0.418. Further, the values of '$C_{\mu b}$' and '$C_{\mu s}$' for control cases of FIGS. 8C-8E are 0.026, 0.104, 0.235 and 0.418, and 0.007, 0.03 and 0.058, respectively. In some embodiments, the location of the holes may be determined based on the turbine blade.

Figure 9:
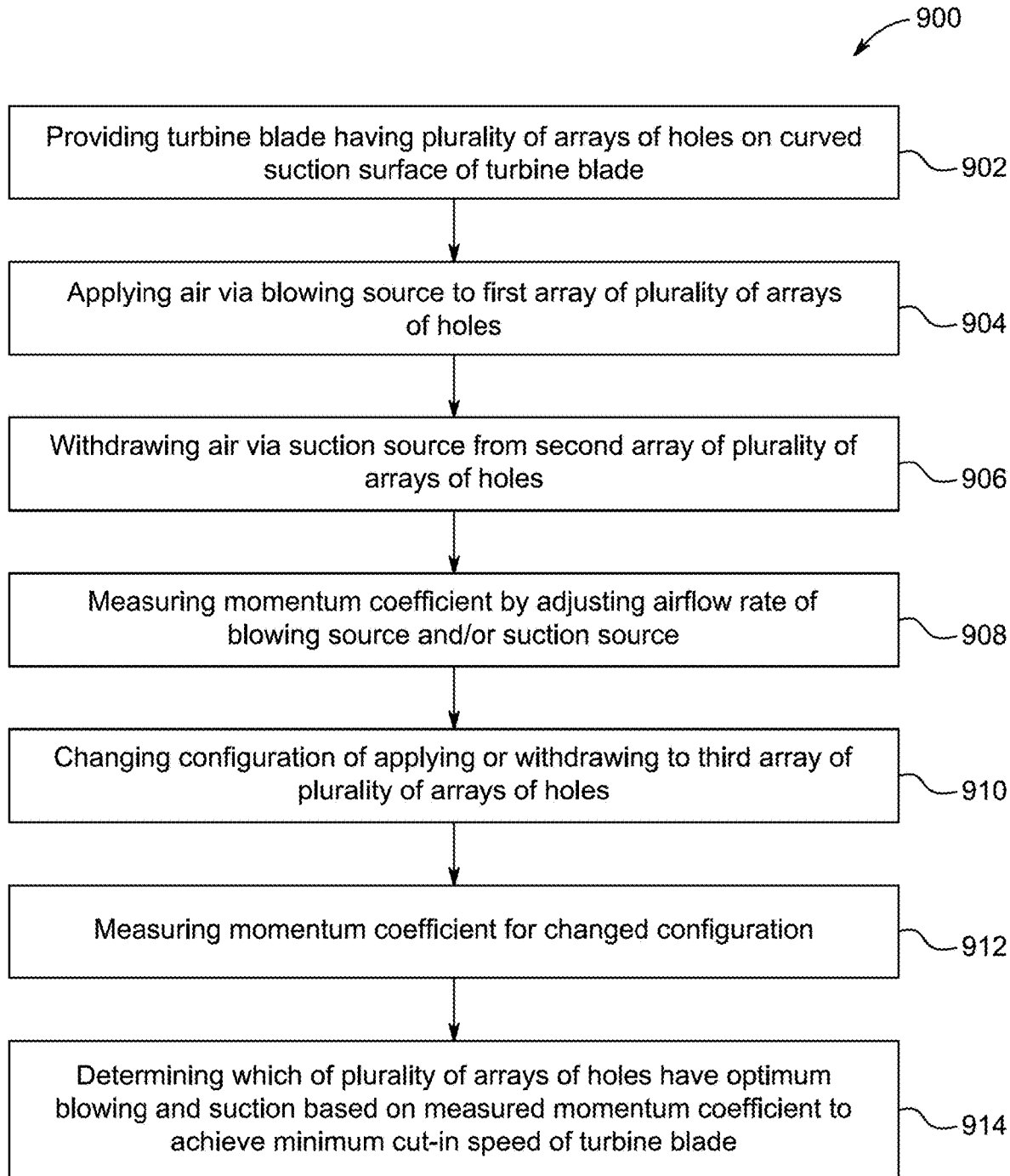
FIG. 9 is an exemplary flowchart of a method of testing air flow in a turbine blade, according to certain embodiments.

The present disclosure also relates to a method of testing air flow in the turbine blade. Various embodiments and variants disclosed above with respect to the apparatus 300 for turbine blade testing apply mutatis mutandis to the present method. Referring to FIG. 9, illustrated is an exemplary flowchart of a method 900 of testing air flow in the turbine blade 100, according to certain embodiments. In general, the method 900 of testing air flow in the turbine blade 100 involves: changing holes used for blowing and suction and determining a momentum coefficient for those various holes; and varying angle of attack with measurement of lift/drag ratio.

In particular, at step 902, the method 900 includes providing the turbine blade 100 having the plurality of arrays of holes 122, 124 on the curved suction surface 102 of the turbine blade 100. At step 904, the method 900 includes applying air via the blowing source 310 to the first array 122a of the plurality of arrays of holes. At step 906, the method 900 includes withdrawing air via the suction source 312 from the second array 124 of the plurality of arrays of holes. At step 908, the method 900 includes measuring the momentum coefficient '$C_\mu$' by adjusting airflow rate of the blowing source 310 and/or the suction source 312. At step 910, the method 900 includes changing a configuration of the applying or withdrawing to a third array 122b of the plurality of arrays of holes. At step 912, the method 900 includes measuring the momentum coefficient '$C_\mu$' for the changed configuration. At step 914, the method 900 includes determining which of the plurality of arrays of holes 122a, 122b, 124 have optimum blowing and suction based on the measured momentum coefficient '$C_\mu$' to achieve the minimum cut-in speed of the turbine blade 100.

In the present embodiments, the applying air is made by connecting 40 mm positioned holes 122a to the air compressor 310 and the withdrawing air is made by connecting 120 mm positioned holes 124 to the vacuum pump 312. Also, 60 mm positioned holes can be connected to either the air compressor 310 or to the vacuum pump 312 to vary the configuration. Further, in the present embodiments, the measuring of the momentum coefficient '$C_\mu$' includes measuring the momentum coefficient '$C_\mu$' at the 40 mm positioned holes 122a and measuring the momentum coefficient '$C_\mu$' at the 120 mm positioned holes 124. Further, in some embodiments, the method 900 includes determining a maximum lift of the turbine blade 100 by adjusting angle of attack '$\alpha$' of the turbine blade 100 between 0° and 25°.

The present disclosure provides an improved and more efficient turbine blade 100 that is designed, developed, tested experimentally, and verified numerically. The turbine blade 100 is proved to enhance the efficiency of a wind turbine. The reduction in the cut-in-speed of the turbine blade 100 helps to generate energy at locations with low wind speeds and produces more power at good windy sites. The improved turbine blade may be used in a variety of wind turbines ranging from small wind turbines for isolated off grid, both hybrid and only wind, power systems and grid connected large capacity wind farms. As examples, wind turbines of 2.75 MW capacity each in Turaif and near Riyadh. The improved turbine blade can be installed in large wind farms such as the 00 MW capacity wind farm at Dumat Al-Jandal. The improved turbine blade can be used in wind turbines of 4.2 MW rated capacity with 150 m rotor diameter, a hub height of 124 m and 6 m foundation height, to provide an effective hub height of 130 m.

Figure 10:
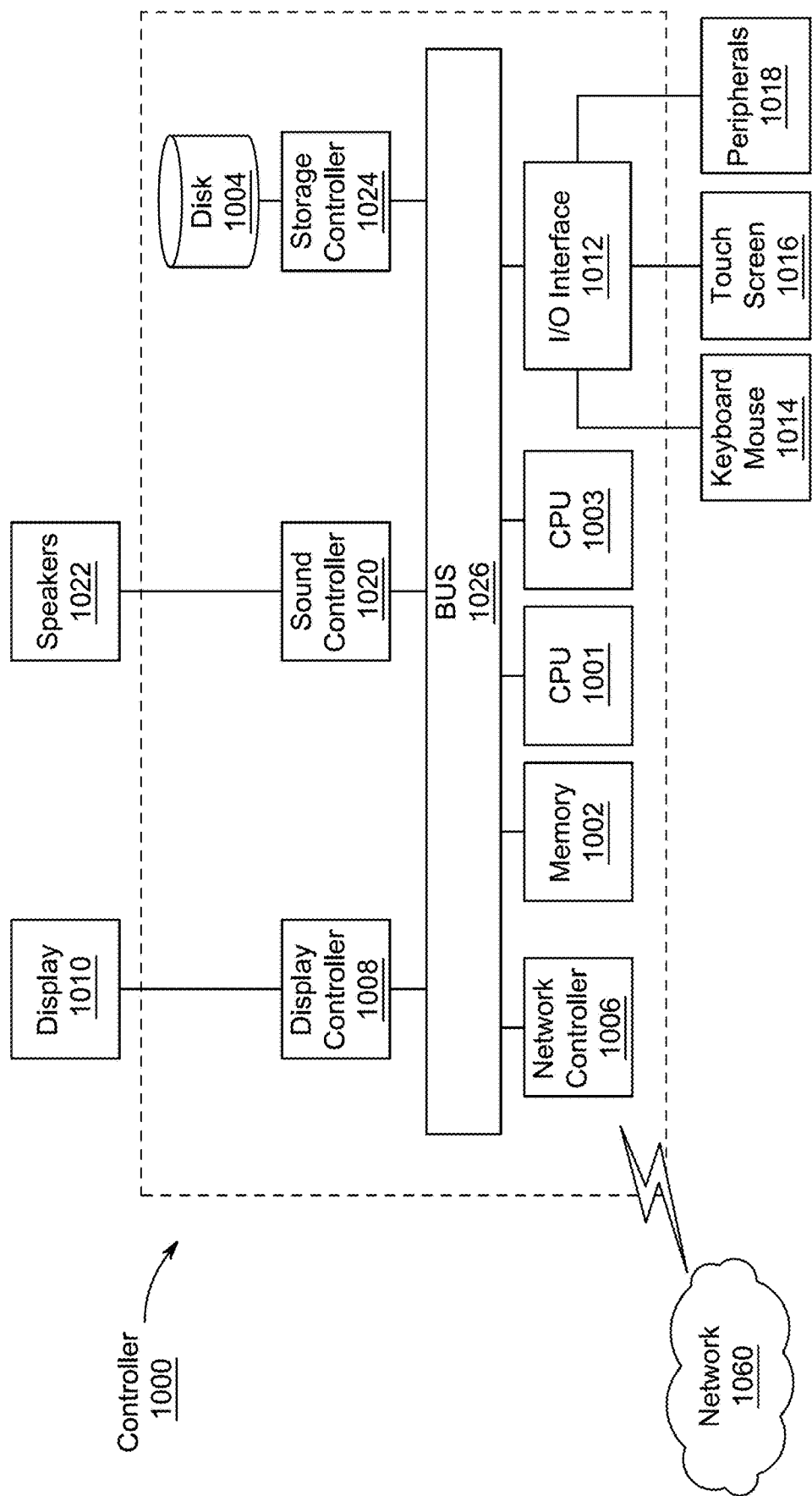
FIG. 10 is an illustration of a non-limiting example of details of computing hardware used in a computing system, according to certain embodiments.

Next, further details of hardware description of a computing system 1000 which may be implemented to control various functions and operation of the apparatus 300 according to exemplary embodiments is described with reference to FIG. 10. In FIG. 10, the controller 1000 is described which is representative of a computing environment in which the controller 1000 (also sometimes referred to as computing device) includes a CPU 1001 which performs the processes described above/below. The process data and instructions may be stored in memory 1002. These processes and instructions may also be stored on a storage medium disk 1004 such as a hard drive (HDD) or portable storage medium or may be stored remotely.

Further, disclosed embodiments are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, disclosed embodiments may be provided as a utility application, background daemon, or component of an operating system, or combination thereof, executing in conjunction with CPU 1001, 1003 and an operating system such as Microsoft Windows 10, Microsoft Windows 10, UNIX, Solaris, LINUX, Apple MAC-OS and other systems known to those skilled in the art.

The hardware elements in order to achieve the computing device may be realized by various circuitry elements, known to those skilled in the art. For example, CPU 1001 or CPU 1003 may be a Xenon or Core processor from Intel of America or an Opteron processor from AMD of America, or may be other processor types that would be recognized by one of ordinary skill in the art. Alternatively, the CPU 1001, 1003 may be implemented on an FPGA, ASIC, PLD or using discrete logic circuits, as one of ordinary skill in the art would recognize. Further, CPU 1001, 1003 may be implemented as multiple processors cooperatively working in parallel to perform the instructions of the inventive processes described above.

The controller 1000 also includes a network controller 1006, such as an Intel Ethernet PRO network interface card from Intel Corporation of America, for interfacing with network 1060. As can be appreciated, the network 1060 can be a public network, such as the Internet, or a private network such as an LAN or WAN network, or any combination thereof and can also include PSTN or ISDN sub-networks. The network 1060 can also be wired, such as an Ethernet network, or can be wireless such as a cellular network including EDGE, 3G and 4G wireless cellular systems. The wireless network can also be WiFi, Bluetooth, or any other wireless form of communication that is known.

The computing device further includes a display controller 1008, such as a NVIDIA Geforce GTX or Quadro graphics adaptor from NVIDIA Corporation of America for interfacing with display 1010, such as a Hewlett Packard HPL2445w LCD monitor.

A sound controller 1020 is also provided in the computing device such as Sound Blaster X-Fi Titanium from Creative, to interface with speakers/microphone 1022 thereby providing sounds and/or music.

The general purpose storage controller 1024 connects the storage medium disk 1004 with communication bus 1026, which may be an ISA, EISA, VESA, PCI, or similar, for interconnecting all of the components of the computing device. A description of the general features and functionality of the display 1010, the display controller 1008, storage controller 1024, network controller 1006, and the sound controller 1020 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The above-described hardware description is a non-limiting example of corresponding structure for performing the functionality described herein.

Numerous modifications and variations of the present disclosure are possible in light of the above teachings. It is therefore to be understood that within the scope of the appended claims, the invention may be practiced otherwise than as specifically described herein.

The invention claimed is:

1. A curved turbine blade for a wind turbine, comprising:
a curved suction surface; and
a plurality of arrays of blowing and suction holes on the curved suction surface,
wherein two arrays of the holes are arranged with blowing holes located 40 mm and suction holes located 120 mm away from a leading edge of the turbine blade,
wherein the curved suction surface has a length of 160 mm±5%.

2. The turbine blade of claim 1, wherein the plurality of arrays of holes are such that an inner diameter, spanwise distance and number of the blowing and suction holes are fixed in an arrangement that minimizes cut-in speed of the turbine blade.

3. The turbine blade of claim 1, wherein the plurality of arrays of holes are such that an inner diameter, spanwise distance and number of the blowing and suction holes are fixed in an arrangement and an angle of attack of the turbine blade provides a maximum lift while optimizing cut-in speed.

4. The turbine blade of claim 1, wherein there are 29 holes in each of the arrays of holes and a center-to-center distance between two adjacent holes is 10 mm.

5. The turbine blade of claim 1, wherein angle of attack of the turbine blade is 14 degrees.

6. The turbine blade of claim 1, wherein a chord length is 200 mm and a span length is 300 mm.

7. The turbine blade of claim 1, wherein the trailing edge is carbon fiber.

8. The turbine blade of claim 1, wherein in a test mode, at least three arrays of the holes are arranged with a first array of holes connected to an air compressor and a second array of holes connected to a vacuum pump, each array at a different distance from the leading edge of the turbine blade, and a third array of holes that change between connected to the air compressor and connected to the vacuum pump, to determine which of the at least three arrays of holes have optimum blowing and suction based on a measured momentum coefficient to achieve a minimum cut-in speed of the turbine blade.

9. The turbine blade of claim 1, wherein in a test mode, the 40 mm positioned holes are connected to an air compressor and the 120 mm positioned holes are connected to a vacuum pump, and the air flow rate is such that the momentum coefficient at the 40 mm positioned holes is 0.104 and the momentum coefficient at the 120 mm positioned holes is 0.07.

10. The turbine blade of claim 1, wherein the turbine blade is configured to adjust angle of attack to give an adjustable lift-to-drag ratio ($C_L/C_D$) where $C_L$ is a lift coefficient and $C_D$ is a drag coefficient.

11. The turbine blade of claim 1, wherein in a test mode, each blowing and suction hole is connected to a tube and, for each array, the tubes are fluidly connected to a single pressure chamber having a single air supply and/or vacuum connector.

* * * * *